US012730766B2

(12) United States Patent
Wren et al.

(10) Patent No.: US 12,730,766 B2
(45) Date of Patent: Sep. 8, 2026

(54) INTERFACE AND MICROCONTROLLER

(71) Applicant: RASPBERRY PI LTD, Cambridge (GB)

(72) Inventors: Luke Michael Wren, Cambridge (GB); Terence Leslie Mackown, Cambridge (GB); Nicholas James Francis, Cambridge (GB)

(73) Assignee: RASPBERRY PI LTD, Cambridge (GB)

( * ) Notice: Subject to any disclaimer, the term of this patent is extended or adjusted under 35 U.S.C. 154(b) by 59 days.

(21) Appl. No.: 18/272,794

(22) PCT Filed: Dec. 10, 2021

(86) PCT No.: PCT/GB2021/053246

§ 371 (c)(1),
(2) Date: Jul. 17, 2023

(87) PCT Pub. No.: WO2022/153025

PCT Pub. Date: Jul. 21, 2022

(65) Prior Publication Data

US 2025/0147907 A1 May 8, 2025

(30) Foreign Application Priority Data

Jan. 18, 2021 (GB) ..................................... 2100601

(51) Int. Cl.
*G06F 13/20* (2006.01)

(52) U.S. Cl.
CPC .......... *G06F 13/20* (2013.01); *G06F 2213/40* (2013.01)

(58) Field of Classification Search
CPC ............................ G06F 13/20; G06F 2213/40
See application file for complete search history.

(56) References Cited

U.S. PATENT DOCUMENTS 5,627,840 A * 5/1997 Hundertmark .............................. G01R 31/318558 714/724
5,805,842 A * 9/1998 Nagaraj ............. G06F 13/4217 710/313

(Continued)

OTHER PUBLICATIONS

"Cortex—MO Technical Reference Manual. Revision r0p1,"Dec. 16, 2012, pp. 1-51.

(Continued)

*Primary Examiner* — Henry Tsai
*Assistant Examiner* — Christopher A Daley
(74) *Attorney, Agent, or Firm* — Foley & Lardner LLP

(57) ABSTRACT

An I/O circuit block comprising:
- a register unit;
- an input/output unit connected to a plurality of terminals;
- an instruction memory; and
- a state machine configured to execute a program stored in the instruction memory to transfer data between the register unit and the input/output unit.

The state machine is configured to execute instructions of an instruction set, the instruction set consisting of: an IN instruction to transfer a specified number of bits into the register unit; and an OUT instruction to transfer a specified number of bits from the register unit; a JMP instruction; a WAIT instruction; a PUSH instruction; a PULL instruction; a MOV instruction; an IRQ instruction; and a SET instruction.

18 Claims, 19 Drawing Sheets

(56) References Cited

U.S. PATENT DOCUMENTS

| | | | | |
|---|---|---|---|---|
| 6,189,052 B1* | 2/2001 | Nilsson | G06F 13/126 710/36 |
| 7,318,112 B2* | 1/2008 | Park | H04M 1/72409 710/63 |
| 7,484,027 B1* | 1/2009 | Dahlin | G06F 13/4072 710/48 |
| 8,719,112 B2* | 5/2014 | Carpenter | G06Q 30/0631 705/26.63 |
| 9,002,899 B2* | 4/2015 | Lambov | G06F 13/124 707/802 |
| 9,870,337 B2* | 1/2018 | Huffman | G06F 13/4291 |
| 10,055,363 B2* | 8/2018 | Sauer | G06F 13/4072 |
| 10,680,615 B1* | 6/2020 | Schultz | H03K 19/17728 |
| 2004/0125751 A1* | 7/2004 | Vangal | H04L 67/1001 370/252 |
| 2014/0198960 A1* | 7/2014 | Thompson | G06V 40/13 382/124 |
| 2016/0147684 A1* | 5/2016 | Sengoku | G06F 13/4282 710/105 |
| 2019/0370068 A1* | 12/2019 | Leyrer | G06F 9/4881 |

OTHER PUBLICATIONS

International Search Report and Written Opinion issued by the International Searching Authority for corresponding PCT Application No. PCT/GB2021/053246, dated Mar. 7, 2022, 14 pages.

Search Report under Section 17(5) issued by the Intellectual Property Office in priority application GB2100601.0, dated Nov. 3, 2021, 3 pages.

* cited by examiner

INTERFACE AND MICROCONTROLLER

CROSS REFERENCE TO RELATED APPLICATIONS

This application is a National Phase entry under 35 U.S.C. 371, to the United States for International Patent Application PCT/GB2021/053246, filed on Dec. 10, 2021, which claims the benefit of GB Application No. 2100601.0, filed on Jan. 18, 2021, the full disclosure of each is incorporated herein in its entirety.

FIELD

The present invention relates to digital interfaces for microcontrollers, and in particular to programmable interfaces capable of driving a wide variety of outputs.

BACKGROUND

Single board computing devices, such as the Raspberry Pi, have become very popular for a variety of hobbyist and industrial uses. The various models of Raspberry Pi are provided with a set of general purpose input/output (GPIO) pins which can be used for a variety of purposes, such as transmitting or receiving data using a variety of interface standards or controlling external devices, and are controlled by the System on Chip (SoC) of the computing device. It is desirable to provide extended capabilities for input and output of data and control of external devices.

SUMMARY

According to the present invention, there is provided an I/O circuit block comprising:

- a register unit;
- an input/output unit connected to a plurality of terminals;
- an instruction memory; and
- a state machine configured to execute a program stored in the instruction memory to transfer data between the register unit and the input/output unit.

Optionally, the state machine is configured to execute instructions of an instruction set, the instruction set including: an IN instruction to transfer a specified number of bits into the register unit; and an OUT instruction to transfer a specified number of bits from the register unit.

Optionally, the instruction set consists of: the IN instruction; the OUT instruction; a JMP instruction; a WAIT instruction; a PUSH instruction; a PULL instruction; a MOV instruction; an IRQ instruction; and a SET instruction.

Optionally, instructions executed by the state machine include an operation to set a value to at least one of the plurality of terminals concurrently with execution of another operation defined by the instruction.

Optionally, the register unit comprises an input FIFO register and an output FIFO register, the input FIFO register and the output FIFO register being configurable as a single, double length FIFO register for input or output.

Optionally, the state machine comprises an input shift register and an output shift register and is operable in an auto pull mode wherein a first predetermined number of bits are transferred from the register unit to the output shift register when the content of the output shift register is less than a first threshold and/or in an auto push mode wherein a second predetermined number of bits are transferred to the register unit from the input shift register when the content of the input shift register is greater than a second threshold.

Optionally, the state machine is configured to also execute instructions from one or more of: the register unit, a shift register within the state machine and a configuration register within the state machine.

Optionally, the state machine comprises a wrap control field specifying a sequence of instructions which are executed repeatedly.

Optionally, the state machine comprises a configurable clock divider to enable the state machine to operate at a lower clock rate than an external clock.

Optionally, there are a plurality of state machines and a corresponding plurality of register units.

Optionally, the instruction memory is shared between the plurality of state machines and configured for multiple simultaneous reads.

Optionally, the input/output unit comprises a multiplexer configured to enable each of the state machines to be connected to any of the terminals.

Optionally, the I/O block has a plurality of IRQ flags and wherein each of the state machines can set and read each of the IRQ flags.

According to the present invention there is also provided an integrated circuit comprising at least one I/O circuit block as described above.

Optionally, the integrated circuit has a plurality of clock sources and wherein the integrated circuit is operable in a DORMANT mode wherein all the clock sources are halted.

Optionally, the circuit is configured to wake from DORMANT mode on receipt of an input without a clock running.

Optionally, the integrated circuit has a plurality of peripheral registers and wherein the peripheral registers are addressable bitwise in at least one of the following modes:

- atomic XOR on write
- atomic bitmask set on write
- atomic bitmask clear on write.

Optionally, the peripheral register comprises a read/write accessible register and a bus interposer which translates upstream atomic writes into downstream read-modify-write sequences.

Optionally, the integrated circuit has at least one general purpose CPU.

According to the present invention there is further provided an assembler for a state machine having an instruction set consisting of: an IN instruction; an OUT instruction; a JMP instruction; a WAIT instruction; a PUSH instruction; a PULL instruction; a MOV instruction; an IRQ instruction; and a SET instruction.

According to the present invention there is further provided an program executable by a state machine having an instruction set consisting of: an IN instruction; an OUT instruction; a JMP instruction; a WAIT instruction; a PUSH instruction; a PULL instruction; a MOV instruction; an IRQ instruction; and a SET instruction.

Embodiments of the present invention can provide a low cost microcontroller device with the quality, cost and simplicity of the Raspberry Pi. Much like the Raspberry Pi is an accessible computer, embodiments of the invention can provide an accessible chip with everything you need to build a product. The present invention can be used in a wide variety of applications, such as providing data interfaces, controlling devices and converting streams of data (e.g. audio data, video data or sensor data) from one format to another. The present invention can be used in consumer products and industrial control settings.

BRIEF INTRODUCTION TO THE DRAWINGS

The invention will be described further below with reference to exemplary embodiments and the accompanying schematic drawings, in which.

In the various drawings, like parts are denoted by like references.

DETAILED DESCRIPTION

The present invention is described below with reference to an embodiment included in a microcontroller referred to herein as the RP2040. It will be appreciated that an interface according to the invention can be used in other microcontrollers and other devices. For example, the interface of the invention may be incorporated in a System on Chip in particular but not exclusively for use in single board computers. The present invention can also be embodied as a separate IC or combined with other modules, such as memory, processors, etc.

Overview

Figure 1:
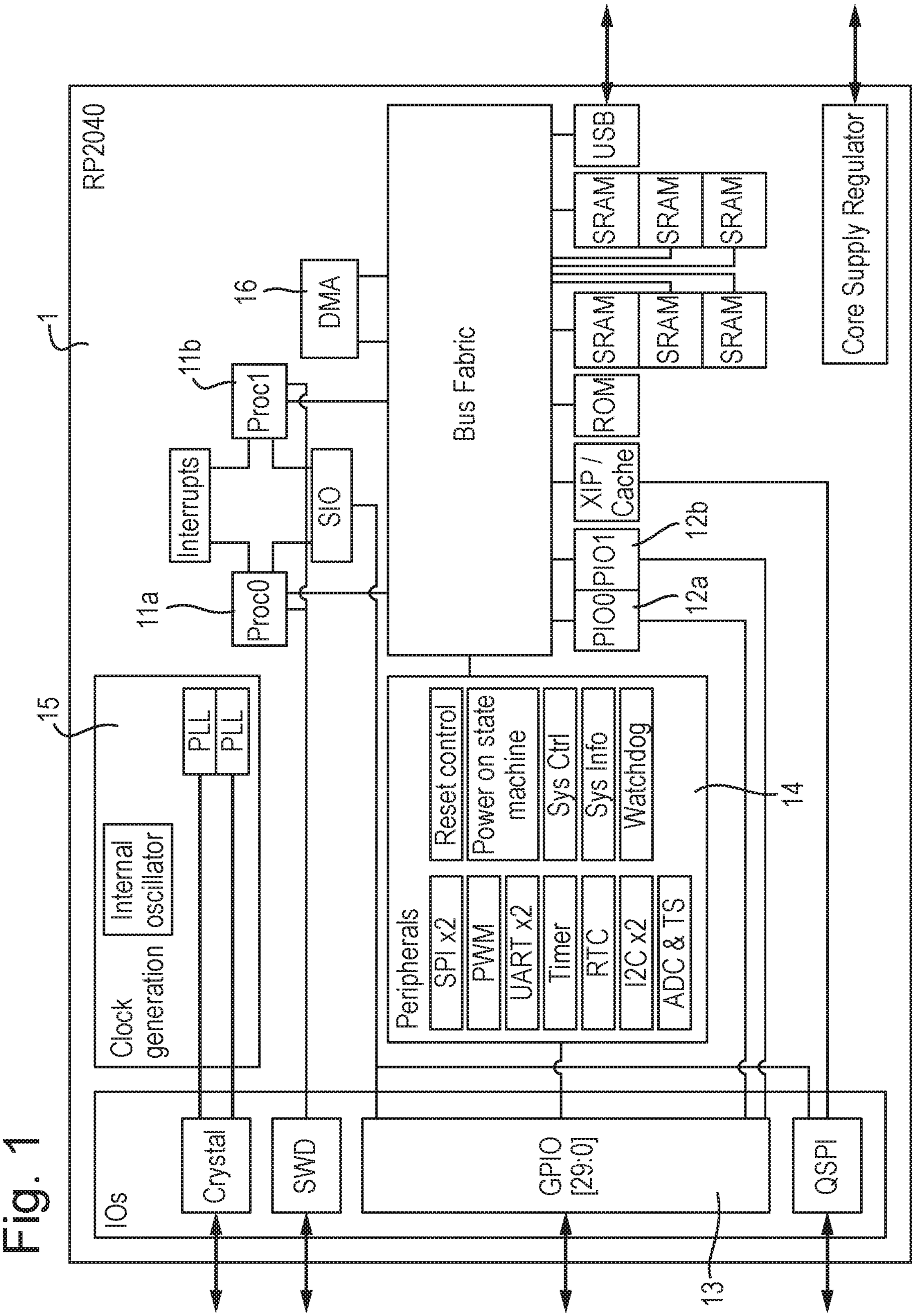
FIG. 1 shows a system overview of an IC incorporating an embodiment of the invention.

A system overview of the RP2040 1 is shown in FIG. 1. It is a low-cost, high-performance microcontroller device with flexible digital interfaces. Key features:

- Dual Cortex M0+ processors 11*a*, 11*b*, up to 133 MHz
- 264 kB of embedded SRAM in 6 banks
- 30 multifunction GPIO 13
- 6 dedicated IO for SPI Flash (supporting XIP)
- Dedicated hardware for commonly used peripherals 14
- Programmable IO for extended peripheral support 12*a*, 12*b*
- 4 channel ADC with internal temperature sensor, 0.5 MSa/s, 12 bit conversion
- direct memory access (DMA) 16
- clock generation unit 15

The RP2040 is supported with both C/C++ and MicroPython cross-platform development environments, including easy access to runtime debugging. It has UF2 boot and floating-point routines baked into the chip. The in-built USB can act as both device and host. It has two symmetric cores and high internal bandwidth, making it useful for signal processing and video. The chip has a large amount of internal RAM but uses external flash, allowing you to choose how much memory you need.

RP2040 has a dual processor complex, internal memory and peripheral blocks connected via AHB/APB bus fabric. Code may be executed directly from external memory through a dedicated SPI, DSPI or QSPI interface. A small cache improves performance for typical applications. Debug is available via the SWD interface. Internal SRAM is arranged in banks which can contain code or data and is accessed via dedicated AHB bus fabric connections, allowing bus masters to access separate bus slaves without being stalled. DMA bus masters are available to offload repetitive data transfer tasks from the processors.

GPIO pins 13 can be driven directly, or from a variety of dedicated logic functions. Dedicated hardware for fixed functions such as SPI, I2C, UART. As discussed in detail below, flexible configurable PIO controllers can be used to provide a wide variety of IO functions.

A USB controller with embedded PHY can be used to provide FS/LS Host or Device connectivity under software control. Four ADC inputs which are shared with GPIO pins. Two PLLs to provide a fixed 48 MHz clock for USB or ADC, and a flexible system clock up to 133 MHz. An internal Voltage Regulator to supply the core voltage so the end product only needs supply the IO voltage.

Bus Fabric

Figure 2:
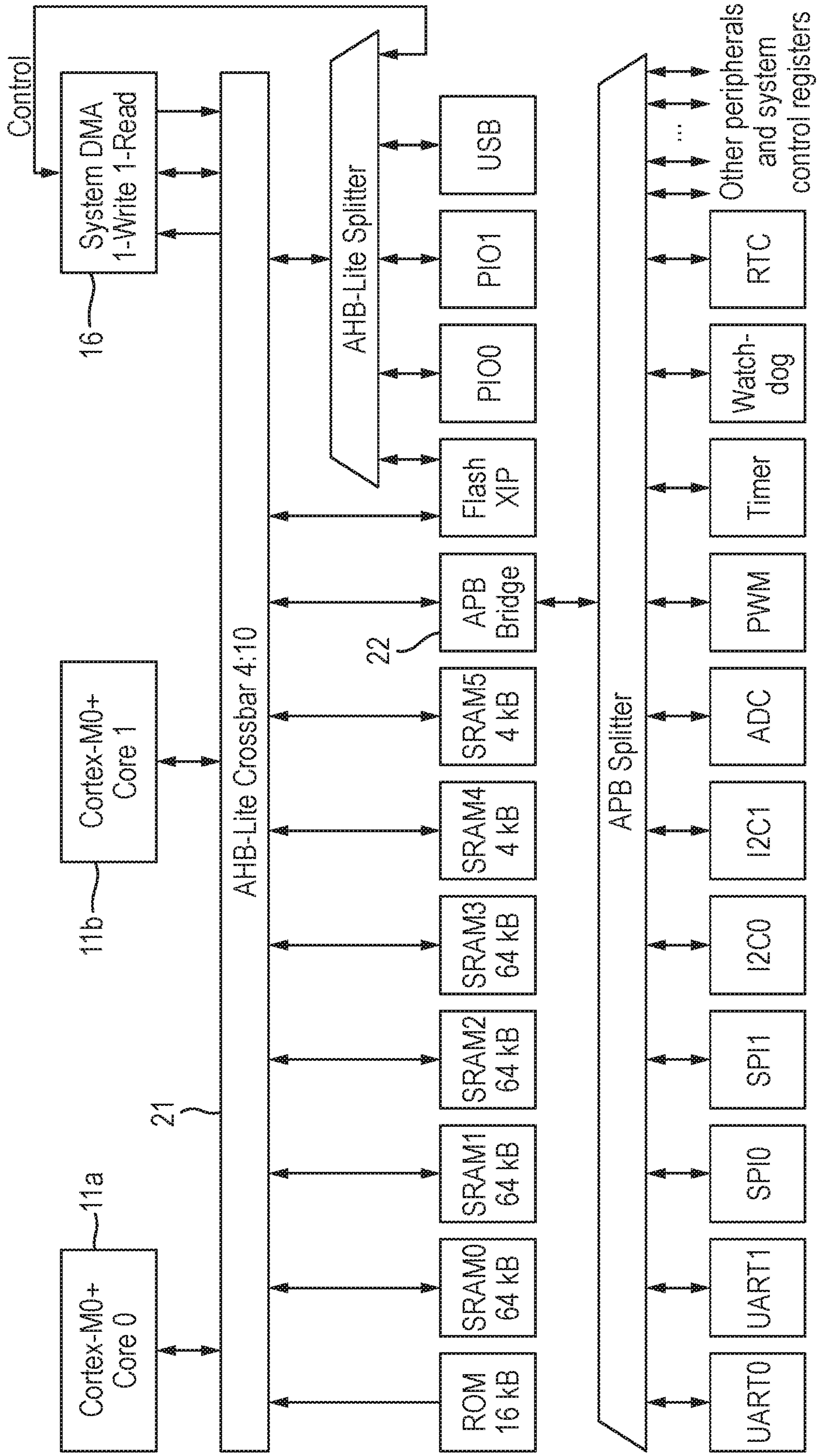
FIG. 2 shows the high-level structure of the bus fabric of the IC of FIG. 1.

The RP2040 bus fabric routes addresses and data across the chip, with a maximum sustained throughput of four 32-bit transfers per system clock cycle. This provides access to code for processor instruction fetch, data, and memory-mapped IO. FIG. 2 shows the high-level structure of the bus fabric. The main AHB-Lite crossbar 21 routes addresses and data between its 4 upstream ports and 10 downstream ports: up to four bus transfers can take place each cycle. All data paths are 32 bits wide. Memory devices have dedicated ports on the main crossbar, to satisfy their high bandwidth requirements. High-bandwidth AHB-Lite peripherals have a shared port on the crossbar, and an APB bridge 22 provides bus access to system control registers and lower-bandwidth peripherals.

The bus fabric connects 4 AHB-Lite masters, i.e. devices which generate addresses:

- Core 0 (Arm Cortex-M0+)
- Core 1 (Arm Cortex-M0+)
- DMA controller Read port
- DMA controller Write port These are routed through to 10 downstream ports on the main crossbar:

- ROM
- Flash XIP
- SRAM 0 to 5 (one port each)
- Fast AHB-Lite peripherals: PIO0, PIO1, USB, DMA control registers, XIP aux (one shared port)
- Bridge to all APB peripherals, and system control registers The four bus masters can access any four different crossbar ports simultaneously, and the bus fabric does not add wait states to any AHB-Lite slave access, so at a system clock of 125 MHz, the maximum sustained bus bandwidth is 2.0 GB/s. The system address map has been arranged to make this parallel bandwidth available to as many software use cases as possible—for example, the striped SRAM alias (SRAM) scatters main memory accesses across four crossbar ports (SRAM0 . . . 3), so that more memory accesses can proceed in parallel.

AHB-Lite Crossbar

Figure 3:
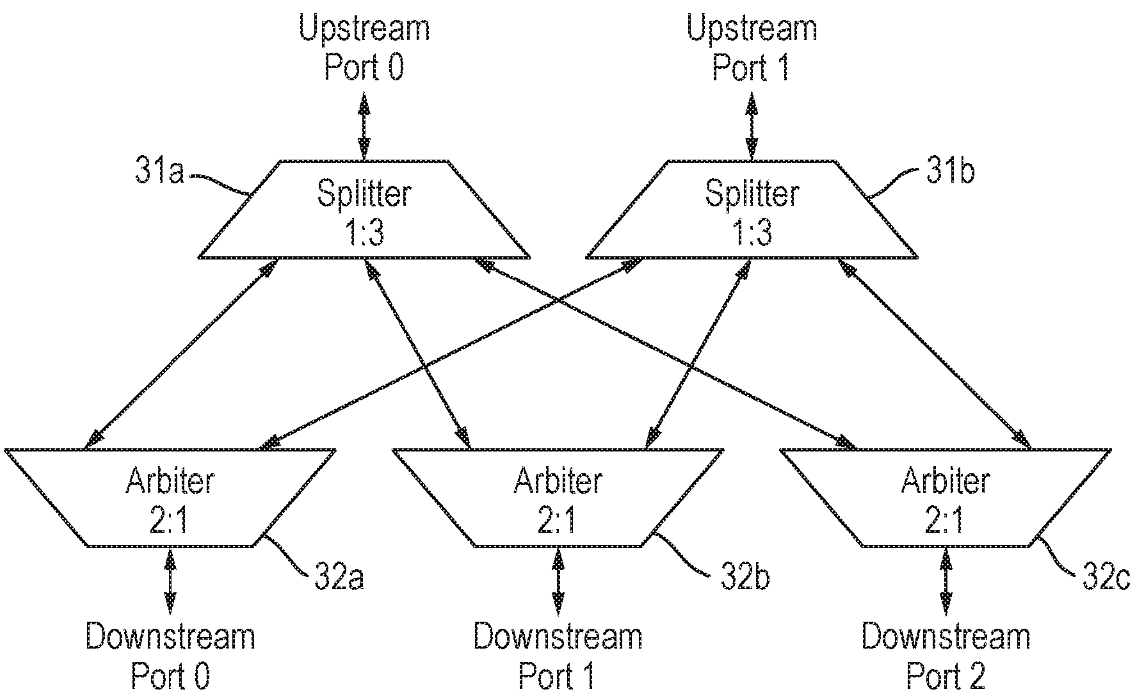
FIG. 3 shows the structure of a 2:3 AHB-Lite crossbar, arranged identically to the 4:10 crossbar included in the IC of FIG. 1.

At the centre of the RP2040 bus fabric is a 4:10 fully-connected crossbar. Its 4 upstream ports are connected to the 4 system bus masters, and the 10 downstream ports connect to the highest-bandwidth AHB-Lite slaves (namely the memory interfaces) and to lower layers of the fabric. FIG. 3 shows the structure of a 2:3 AHB-Lite crossbar, arranged identically to the 4:10 crossbar on RP2040. Each upstream port connects to a splitter 31*a,b*, which routes bus requests toward one of the 3 downstream ports, and routes responses back. Each downstream port connects to an arbiter 32*a,b,c*, which safely manages concurrent access to the port.

The crossbar is built from two components:

Splitters
- Perform coarse address decode
- Route requests (addresses, write data) to the downstream port indicated by the initial address decode
- Route responses (read data, bus errors) from the correct arbiter back to the upstream port Arbiters
- Manage concurrent requests to a downstream port
- Route responses (read data, bus errors) to the correct splitter
- Implement bus priority rules The main crossbar on RP2040 consists of 4 1:10 splitters and 10 4:1 arbiters, with a mesh of 40 AHB-Lite bus channels between them. Note that, as AHB-Lite is a pipelined bus, the splitter may be routing back a response to an earlier request from downstream port A, whilst a new request to downstream port B is already in progress. This does not incur any cycle penalty.

Processor Subsystem

Figure 4:
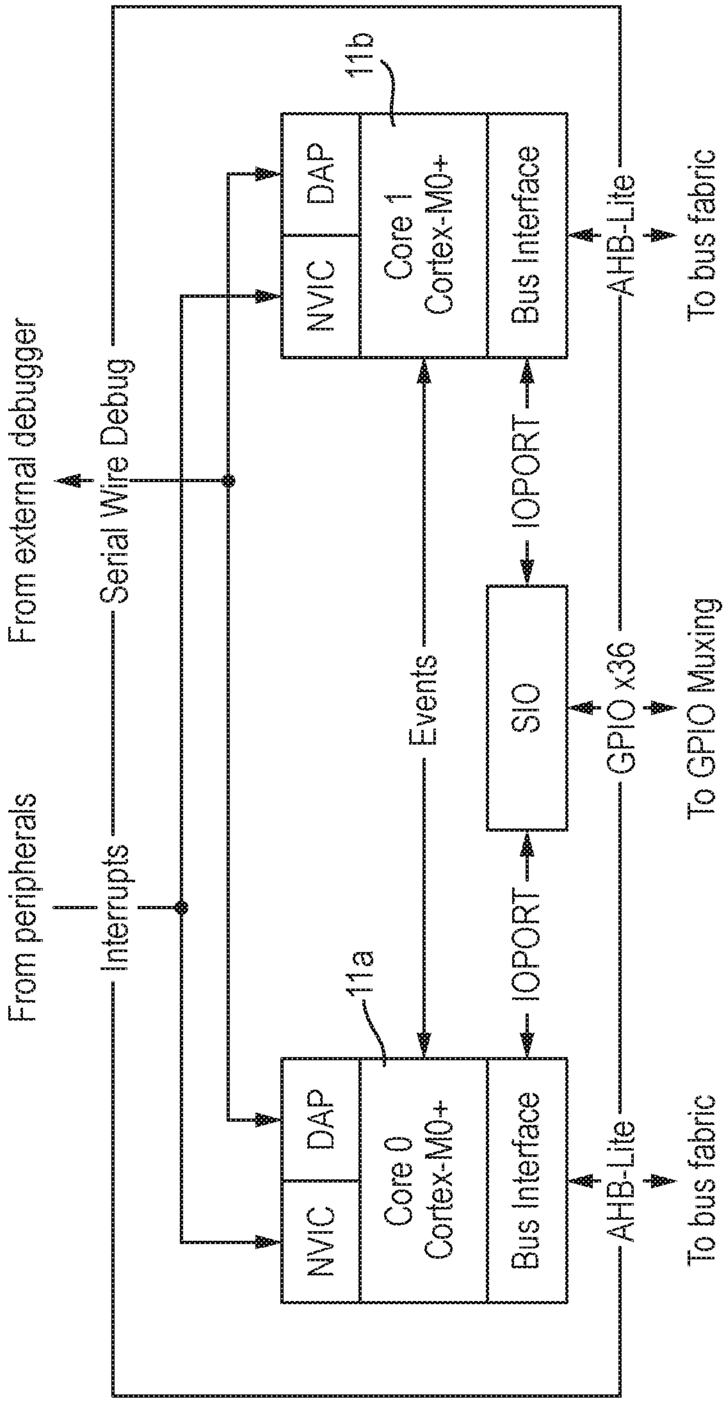
FIG. 4 shows the processor subsystem of the IC of FIG. 1.

As shown in FIG. 4, the RP2040 processor subsystem consists of two Arm Cortex-M0+ processors 11*a,b*—each with its standard internal Arm CPU peripherals—alongside external peripherals for GPIO access and inter-core communication. A single processor or more than two processors maybe included. Two processors are advantageous because one can be used to manage high level chip functions and the other to manage low level data. Details of the Arm Cortex-M0+ processors can be found at arm.com. Other types of CPU can also be used.

Two Cortex-M0+ processors are each provided with a dedicated 32-bit AHB-Lite bus port, for code fetch, loads and stores. The SIO is connected to the single-cycle IOPORT bus of each processor, and provides GPIO access, two-way communications, and other core-local peripherals. Both processors can be debugged via a single multi-drop Serial Wire Debug bus. 26 interrupts (plus NMI) are routed to the NVIC and WIC on each processor.

The processors use a number of interfaces to communicate with the rest of the system:
- Each processor use its own independent 32-bit AHB-Lite bus to access memory and memory-mapped peripherals (more detail in Bus Fabric)
- The single-cycle IO block provides high-speed, deterministic access to GPIOs via each processor's IOPORT
- 26 system-level interrupts are routed to both processors
- A multi-drop Serial Wire Debug bus provides debug access to both processors from an external debug host Single-Cycle IO Block (SIO)

Figure 5:
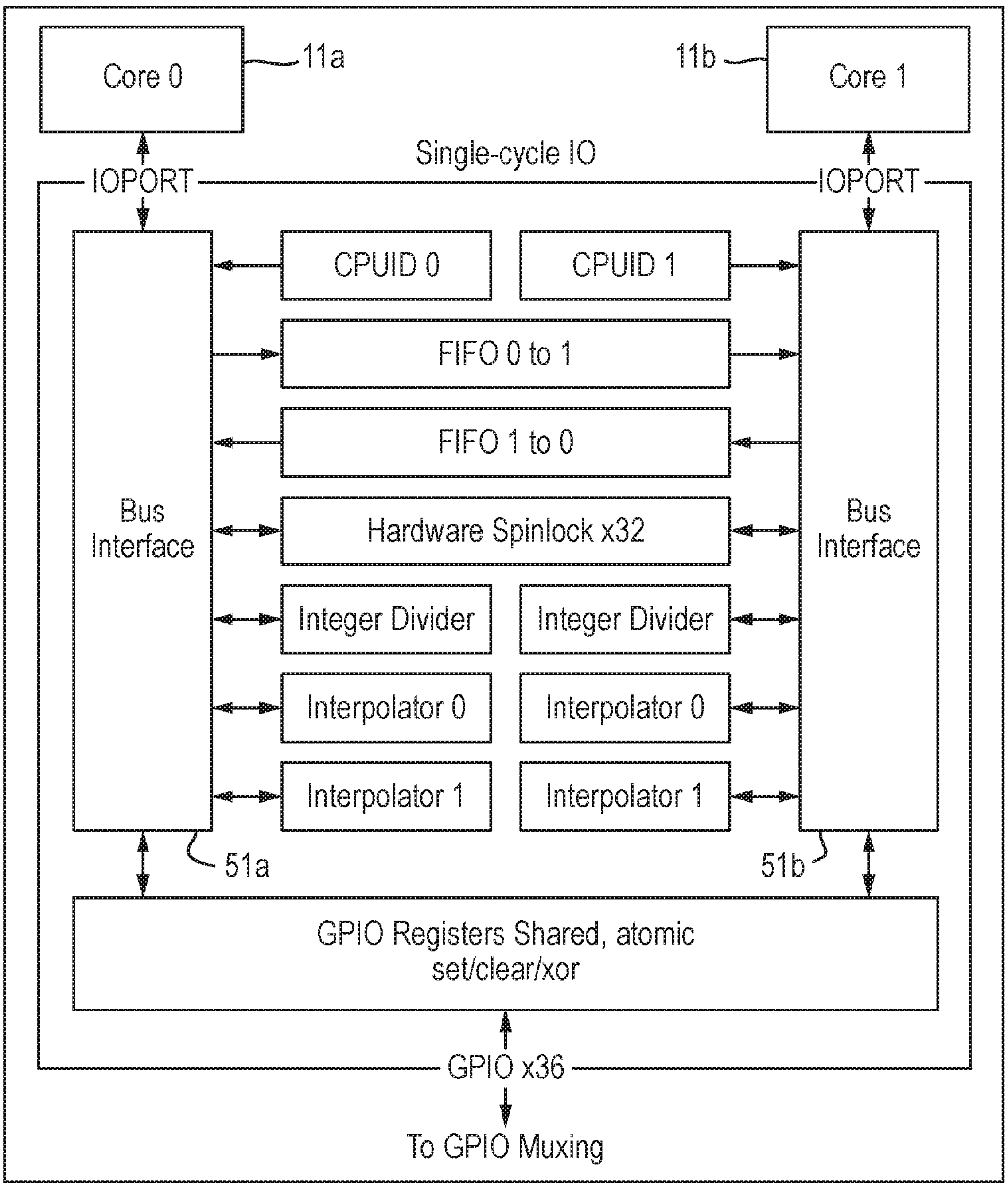
FIG. 5 shows a Single-cycle IO block (SIO)

The Single-cycle IO block (SIO), shown in FIG. 5, contains several peripherals that require low-latency, deterministic access from the processors. It is accessed via each processor's IOPORT: this is an auxiliary bus port on the Cortex-M0+ which can perform rapid 32-bit reads and writes. The SIO has a dedicated bus interface 51*a, b* for each processor's IOPORT, as shown in FIG. 5. Processors access their IOPORT with normal load and store instructions, directed to the special IOPORT address segment, 0xd0000000 . . . 0xdfffffff.

The SIO appears as memory-mapped hardware within the IOPORT space. The single-cycle IO block contains memory-mapped hardware which the processors must be able to access quickly. The FIFOs and spinlocks support message passing and synchronisation between the two cores. The shared GPIO registers provide fast and concurrency-safe direct access to GPIO-capable pins.

Some core-local arithmetic hardware can be used to accelerate common tasks on the processors.

All IOPORT reads and writes (and therefore all SIO accesses) take place in exactly one cycle, unlike the main AHB-Lite system bus, where the Cortex-M0+ requires two cycles for a load or store, and may have to wait longer due to contention from other system bus masters. This is vital for interfaces such as GPIO, which have tight timing requirements.

SIO registers are mapped to word-aligned addresses in the range 0xd0000000 . . . 0xd000017c. The remainder of the IOPORT space is reserved for future use.

GPIO Overview

RP2040 has 36 multi-functional General Purpose Input/Output (GPIO) pins 13, divided into two banks. In a typical use case, the pins in the QSPI bank (QSPI_SS, QSPI_SCLK and QSPI_SD0 to QSPI_SD3) are used to execute code from an external flash device, leaving the User bank (GPIO0 to GPIO29) for the programmer to use. All GPIOs support digital input and output, but GPIO26 to GPIO29 can also be used as inputs to the chip's Analogue to Digital Converter (ADC). Each GPIO can be controlled directly by software running on the processors, or by a number of other functional blocks.

Figure 6:
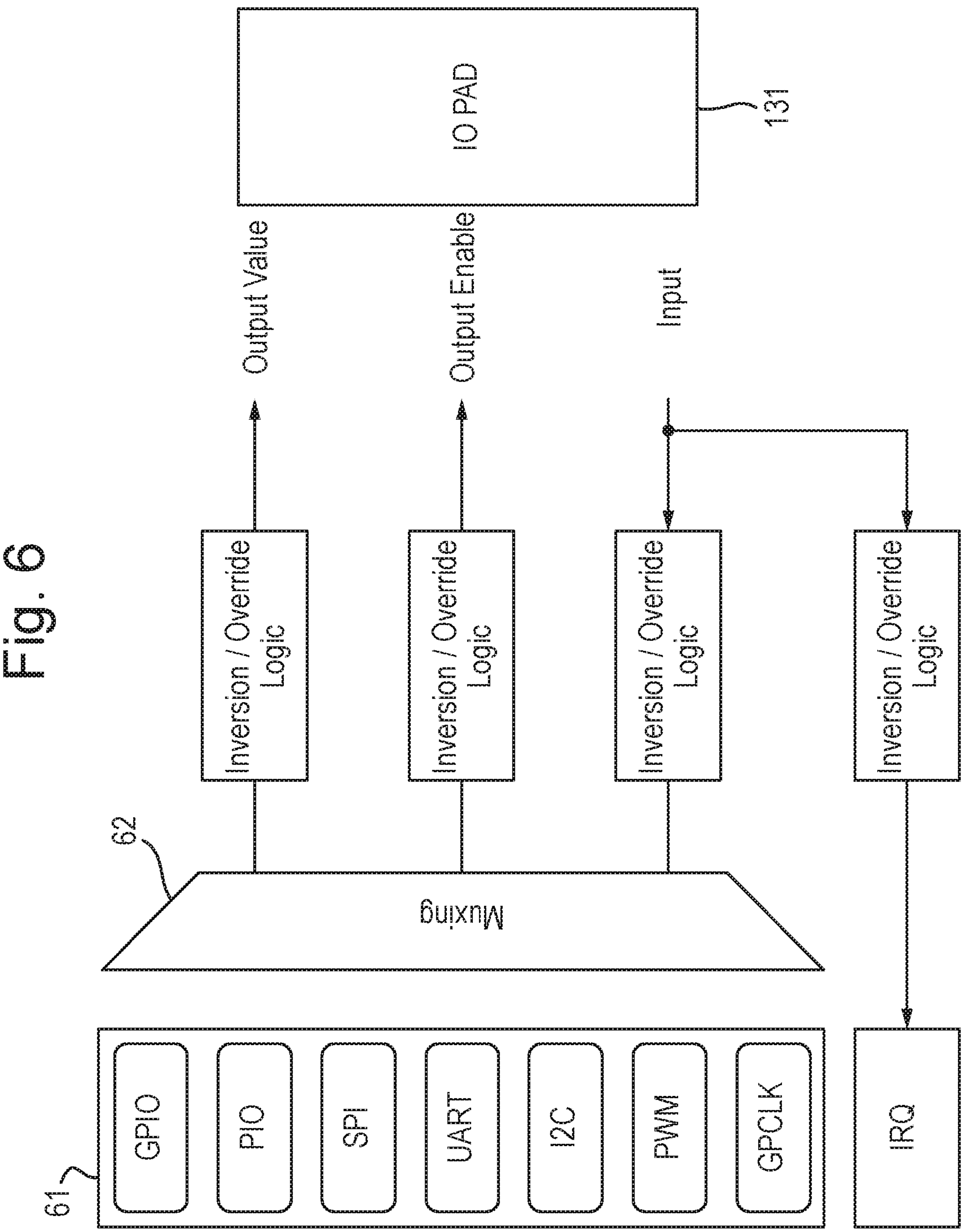
FIG. 6 shows multiplexing logic for a GPIO.

The User GPIO bank supports the following functions:
- processor controlled general purpose IO (GPIO)
- programmable IO (PIO)
- 2×SPI
- 2×UART
- 2×I2C (two-wire serial interface)
- 8×two-channel PWM
- 2×external clock inputs
- 4×general purpose clock output
- 4×input to ADC
- USB VBUS management
- External interrupt requests, level or edge-sensitive The QSPI bank supports the following functions:
- processor controlled General Purpose IO (GPIO)
- Flash execute in place (XIP)—Execute-In-Place The logical structure of an example IO is shown in FIG. 6. Each GPIO 131 can be controlled by one of a number of peripherals 61, or by software control registers in the SIO. The function select (FSEL) 62 selects which peripheral output is in control of the GPIO's direction and output level, and/or which peripheral input can see this GPIO's input level. These three signals (output level, output enable, input level) can also be inverted, or forced high or low, using the GPIO control registers.

Pads

Each GPIO is connected to the off-chip world via a "pad". Pads are the electrical interface between the chip's internal logic and external circuitry. They translate signal voltage levels, support higher currents and offer some protection against electrostatic discharge (ESD) events. Pad electrical behaviour can be adjusted to meet the requirements of the external circuitry. The following adjustments are available:

Output drive strength can be set to 2 mA, 4 mA, 8 mA or 12 mA

Output slew rate can be set to slow or fast

Input hysteresis (schmitt trigger mode) can be enabled

A pull-up or pull-down can be enabled, to set the output signal level when the output driver is disabled The input buffer can be disabled, to reduce current consumption when the pad is unused, unconnected or connected to an analogue signal.

Figure 7:
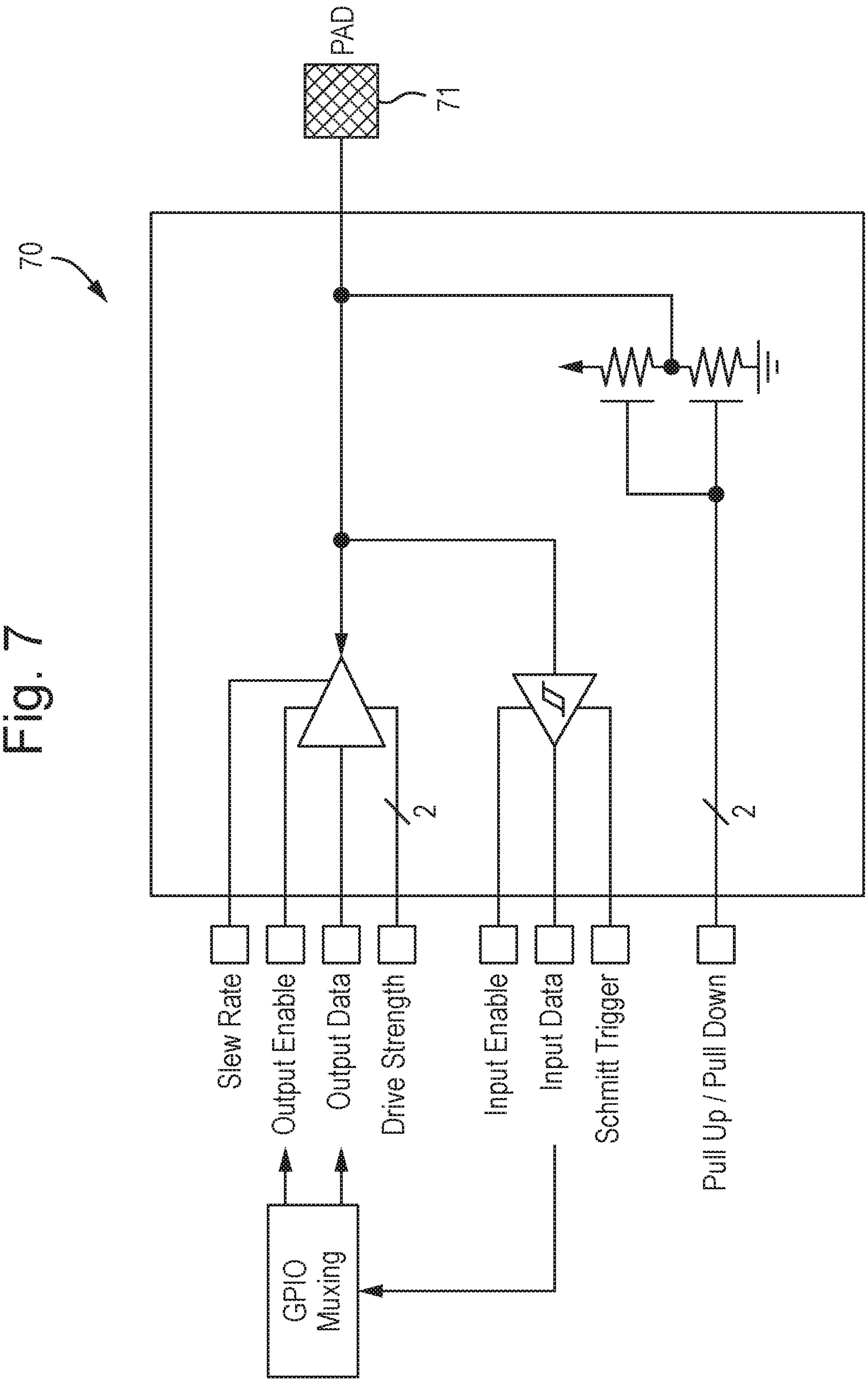
FIG. 7 shows an example of an I/O pad.

An example pad is shown in FIG. 7.

The pad's Output Enable, Output Data and Input Data ports are connected, via the IO mux, to the function controlling the pad. All other ports are controlled from the pad control register. The register also allows the pad's output driver to be disabled, by overriding the Output Enable signal from the function controlling the pad. See GPIO0 for an example of a pad control register.

Both the output signal level and acceptable input signal level at the pad terminal 71 are determined by the digital IO supply (IOVDD).

IOVDD can be any nominal voltage between 1.8V and 3.3V, but to meet specification when powered at 1.8V, the pad input thresholds must be adjusted by writing a 1 to the pad VOLTAGE_SELECT registers. By default the pad input thresholds are valid for an IOVDD voltage between 2.5V and 3.3V. Using a voltage of 1.8V with the default input thresholds is a safe operating mode, though it will result in input thresholds that don't meet specification.

Pad input threshold are adjusted on a per bank basis, with separate VOLTAGE_SELECT registers for the pads associated with the User IO bank (IO Bank 0) and the QSPI IO bank. However, both banks share the same digital IO supply (IOVDD), so both register should always be set to the same value.

Figure 8:
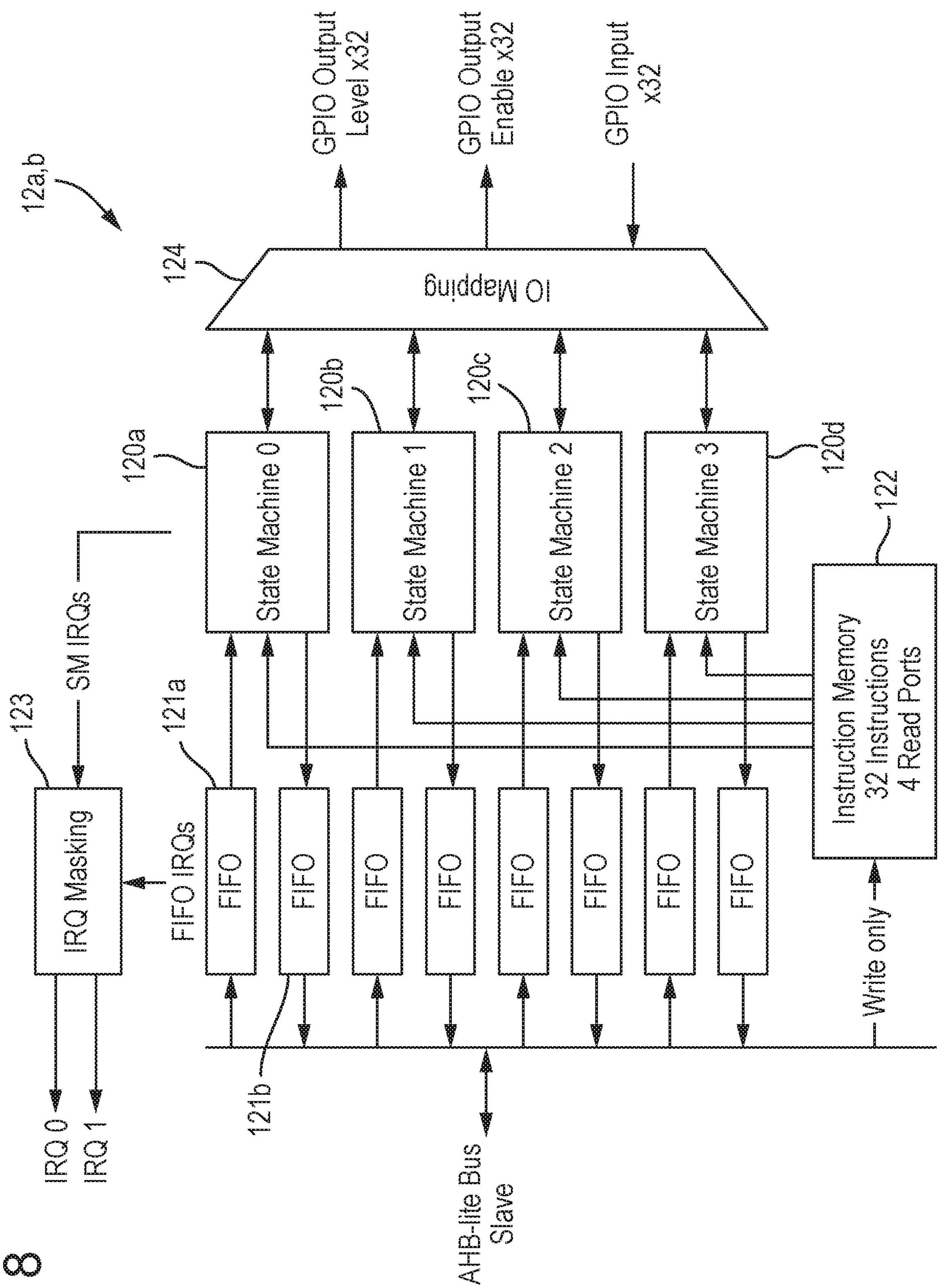
FIG. 8 is a block-level diagram of a programmable input/output module.

Programmable Input/Output (PIO) FIG. 8 is a block-level diagram of a programmable input/output block or module (PIO) 12*a,b*. There are two PIO blocks with four state machines 120*a,b,c,d* each. There may be only one PIO block or more than two PIO blocks. Each PIO block may have more or fewer than four state machines. The four state machines simultaneously execute programs from a shared instruction memory 122. FIFO data queues 121*a,b* buffer data transferred between PIO and the system. GPIO mapping logic 124 allows each state machine to observe and manipulate up to 32 GPIOs. IRQ masking 12 flexibly connects multiple internal IRQ flags of each PIO to two external IRQ flags.

The programmable input/output block (PIO) is a versatile hardware interface. It can support a variety of IO standards, including:

8080 and 6800 parallel bus

I2C 3-pin I2S

SDIO

SPI, DSPI, QSPI

UART

DPI or VGA (via resistor DAC)

Other standards can also be accommodated.

A PIO is programmable in the same sense as a processor. There are two PIO blocks with four state machines each, that can independently execute sequential programs to manipulate GPIOs and transfer data. Unlike a general purpose processor, PIO state machines are highly specialised for IO, with a focus on determinism, precise timing, and close integration with fixed-function hardware. Each state machine is equipped with:

Two 32-bit shift registers—either direction, any shift count

Two 32-bit scratch registers

4×32 bit bus FIFO in each direction (TX/RX), reconfigurable as 8×32 in a single direction Fractional clock divider (16 integer, 8 fractional bits)

Flexible GPIO mapping

DMA interface, sustained throughput up to 1 word per clock from system DMA

IRQ flag set/clear/status

The registers and bus FIFO may be longer or shorter than 32 bits, e.g. 16 or 64 bits. Each state machine, along with its supporting hardware, occupies approximately the same silicon area as a standard serial interface block, such as an SPI or I2C controller. However, PIO state machines can be configured and reconfigured dynamically to implement numerous different interfaces.

Making state machines programmable in a software-like manner, rather than a fully configurable logic fabric like a complex programmable logic device (CPLD), allows more hardware interfaces to be offered in the same cost and power envelope. This also presents a more familiar programming model, and simpler tool flow, to those who wish to exploit PIO's full flexibility by programming it directly, rather than using a premade interface from the PIO library.

PIO is highly performant as well as flexible, thanks to a carefully selected set of fixed-function hardware inside each state machine. For example, video data can be output at a rate of 360 Mb/s during the active scanline period when running from a 48 MHz system clock. To achieve this, one state machine is used to handle frame/scanline timing and generate the pixel clock, while another handles the pixel data, and unpacks run-length-encoded scanlines.

State machines' inputs and outputs are mapped to up to 32 GPIOs, and all state machines have independent, simultaneous access to any GPIO. For example, the standard UART code allows TX, RX, CTS and RTS to be any four arbitrary GPIOs, and I2C permits the same for SDA and SCL. The amount of freedom available depends on how exactly a given PIO program chooses to use PIO's pin mapping resources, but at the minimum, an interface can be freely shifted up or down by some number of GPIOs.

Programmer's Model

The four state machines execute from a shared instruction memory. System software loads programs into this memory, configures the state machines and IO mapping, and then sets the state machines running. PIO programs come from various sources: assembled directly by the user, drawn from the PIO library, or generated programmatically by user software.

From this point on, state machines are generally autonomous, and system software interacts through DMA, interrupts and control registers, as with other peripherals on RP2040. For more complex interfaces, PIO provides a small but flexible set of primitives which allow system software to be more hands-on with state machine control flow.

Figure 9:
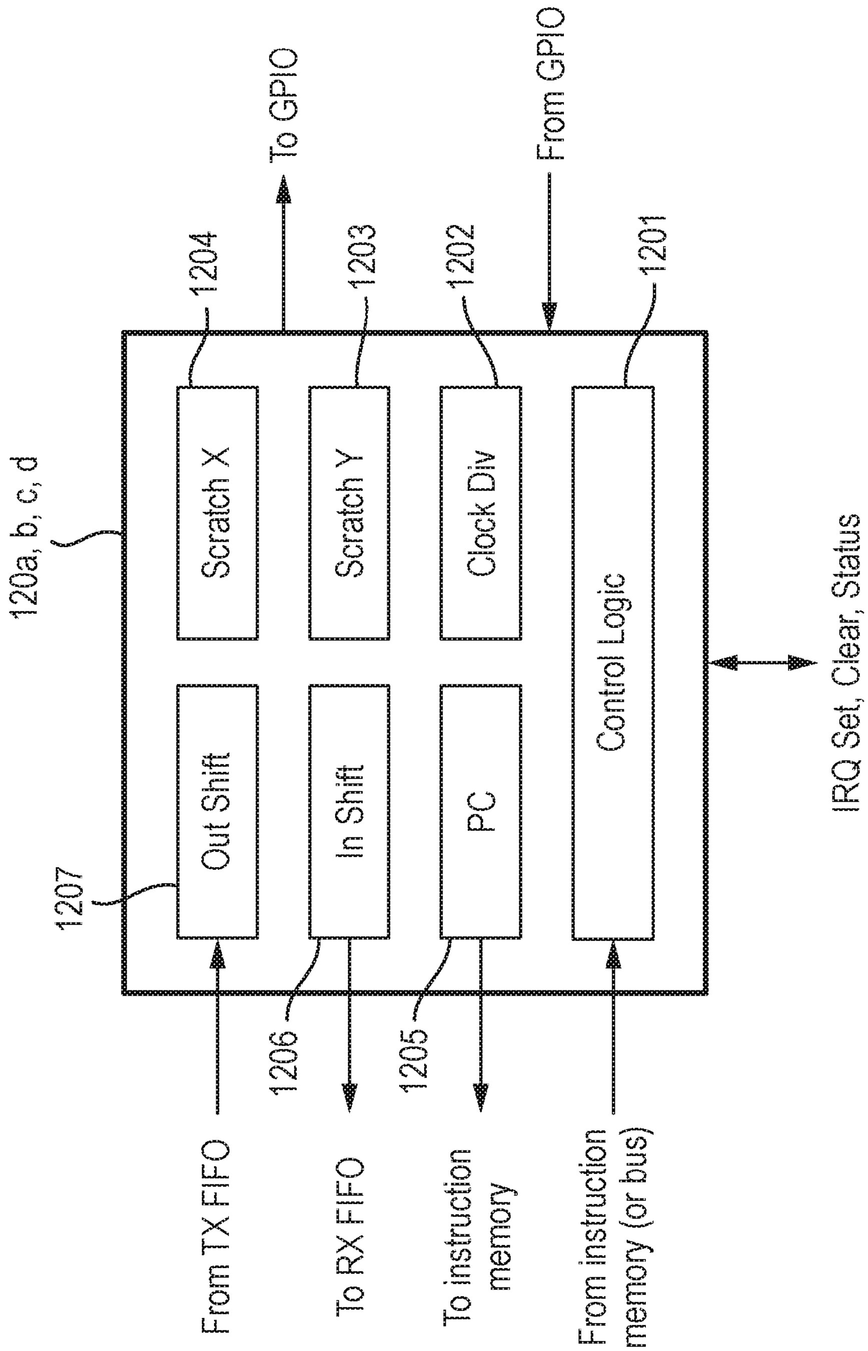
FIG. 9 is an overview of a state machine.

FIG. 9 shows an overview of an example state machine. Data flows in and out through a pair of FIFOs. Control logic 1201 of the state machine executes a program which transfers data between these FIFOs, a set of internal registers 1203, 1204,1206, 1207, and the pins. The clock divider 1202 can reduce the state machine's execution speed by a constant factor. A program counter 1205 keeps track of the instruction being executed.

PIO Programs

PIO state machines execute short, binary programs. Programs for common interfaces, such as UART, SPI, or I2C, are available in the PIO library, so in many cases, it is not necessary to write PIO programs. However, the PIO is much more flexible when programmed directly, supporting a wide variety of interfaces which may not have been foreseen by its designers.

The PIO has a total of nine instructions: JMP, WAIT, IN, OUT, PUSH, PULL, MOV, IRQ, and SET which are discussed in more detail below. More, fewer or different instructions may be implemented but the present inventors have determined that this set achieves a desirable balance between complexity of the state machine, flexibility and efficiency of programming; fewer instructions may reduce functionality and/or require programs to be longer whereas more instructions would require the state machine to be more complex, possibly meaning it has to run at a lower clock speed or have higher power consumption.

Though the PIO only has a total of nine instructions, it would be difficult to edit PIO program binaries by hand. PIO assembly is a textual format, describing a PIO program, where each command corresponds to one instruction in the output binary. Below is a link to an example program in PIO assembly:

https://github.com/raspberrypi/pico-examples/blob/masterl/pio/squarewave/squarewave.pio The PIO assembler is included with the Pico SDK, and is called pioasm. This program processes a PIO assembly input text file, which may contain multiple programs, and writes out the assembled programs ready for use. For the Pico SDK these assembled programs are emitted in form of C headers, containing constant arrays.

3.2.2. Control Flow

On every system clock cycle, each state machine fetches, decodes and executes one instruction. Each instruction takes precisely one cycle, unless it explicitly stalls (such as the WAIT instruction). Instructions may also insert a delay of up to 31 cycles before the next instruction is executed to aid the writing of cycle-exact programs.

The program counter, or PC, points to the location in the instruction memory being executed on this cycle. Generally, PC increments by one each cycle, wrapping at the end of the instruction memory. Jump instructions are an exception and explicitly provide the next value that PC will take. An example program can be found at https://github.com/raspberrypi/pico-examples blob/master/pio/squarewave/squarewave.pio Our example assembly program shows both of these concepts in practice. It drives a 50/50 duty cycle square wave onto a GPIO, with a period of four cycles. Using some other features (e.g. side-set, discussed below) this can be made as low as two cycles. The system has write-only access to the instruction memory, which is used to load programs:

https://github.com/raspberrypi/pico-examples/blob/master/pio/squarewave/squarewave.c The clock divider slows the state machine's execution by a constant factor, represented as a 16.8 fixed-point fractional number. Using the above example, if a clock division of 2.5 were programmed, the square wave would have a period of 4×2.5=10 cycles. This is useful for setting a precise baud rate for a serial interface, such as a UART, as shown in line 47 of the previously referenced program.

The system can start and stop each state machine at any time, via the CTRL register. Multiple state machines can be started simultaneously, and the deterministic nature of PIO means they can stay perfectly synchronised, as demonstrated in line 67 of the referenced program.

The above code fragments are part of a complete application which drives a 12 MHz square wave out of GPIO 0.

Most instructions are executed from the instruction memory, but there are other sources, which can be freely mixed:

- Instructions written to a special configuration register (SMx INSTR) are immediately executed, momentarily interrupting other execution. For example, a JMP instruction written to SMx INSTR will cause the state machine to start executing from a different location.
- Instructions can be executed from a register, using the MOV EXEC instruction.
- Instructions can be executed from the output shifter, using the OUT EXEC instruction The last of these is particularly versatile: instructions can be embedded in the stream of data passing through the FIFO. The I2C example (below) uses this to embed e.g. STOP and RESTART line conditions alongside normal data. In the case of MOV and OUT EXEC, the MOV/OUT itself executes in one cycle, and the execute on the next.

Registers

Figure 10:
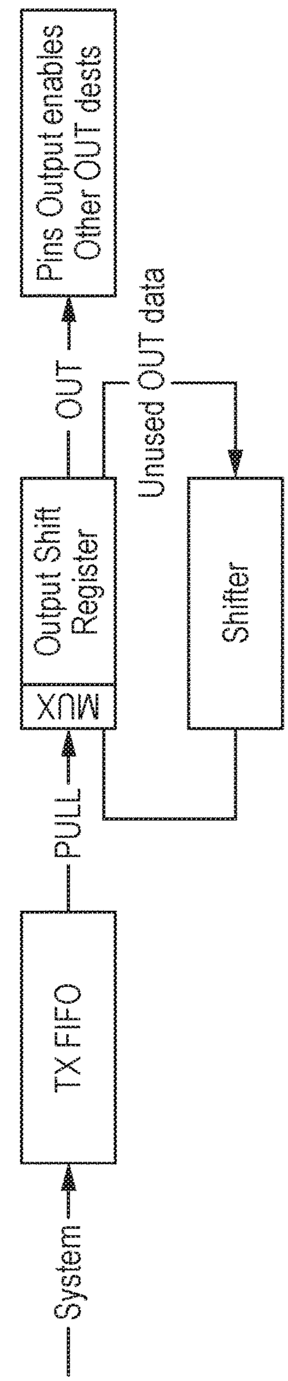
FIG. 10 shows an example of an Output Shift Register (OSR)

Each state machine possesses a small number of internal registers. These hold input or output data, and temporary values such as loop counter variables. FIG. 10 is an example of an Output Shift Register (OSR) 1207. Data is parcelled out 1 . . . 32 bits at a time, and unused data is recycled by a bidirectional shifter. Once empty, the OSR is reloaded from the TX FIFO.

The Output Shift Register (OSR) holds and shifts output data, between the TX FIFO and the pins (or other destinations, such as the scratch registers).

- PULL instructions pop a 32-bit word from the TX FIFO into the OSR.
- OUT instructions shift data from the OSR to other destinations, 1 . . . 32 bits at a time.
- The OSR fills with zeroes as data is shifted out
- The state machine will automatically refill the OSR from the FIFO on an OUT instruction, once some total shift count threshold is reached, if autopull is enabled
- Shift direction can be left/right, configurable by the processor via configuration registers For example, to stream data through the FIFO and output to the pins at a rate of one byte per two clocks, see https://datasheets.raspberrypi.com/rp2040/rp2040-datasheet.pdf, page 334—pull_example1

Autopull allows the hardware to automatically refill the OSR in the majority of cases, with the state machine stalling if it tries to OUT from an empty OSR. This has two benefits:

- No instructions spent on explicitly pulling from FIFO at the right time
- Higher throughput: can output up to 32 bits on every single clock cycle, if the FIFO stays topped up After configuring autopull, the above referenced program can be simplified to the following, which behaves identically:

https://datasheets.raspberrypi.com/rp2040/rp2040-datasheet.pdf, page 334—pull_example2

Program wrapping (discussed below) allows further simplification and, if desired, an output of 1 byte every system clock cycle, demonstrated at https://datasheets.raspberrypi.com/rp2040/rp2040-datasheet.pdf, page 334—pull_example3

Input Shift Register (ISR)

Figure 11:
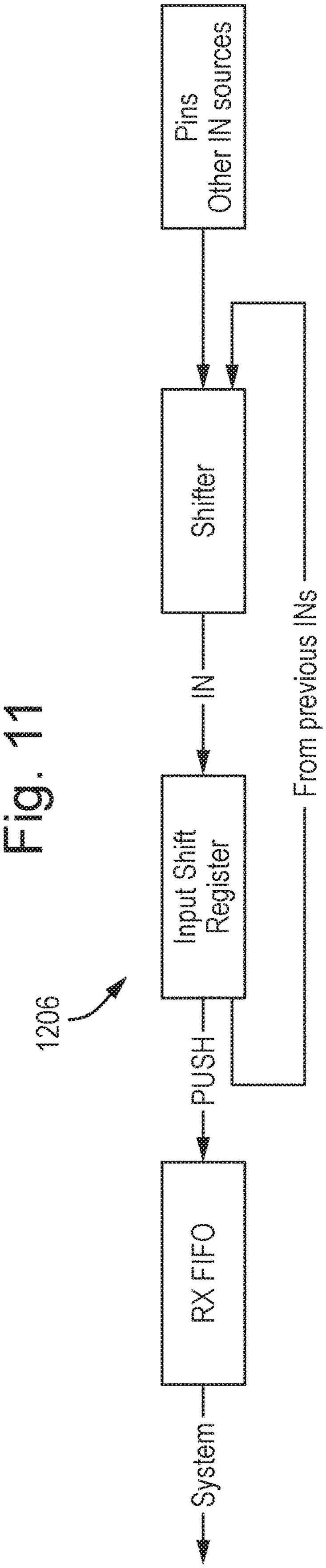
FIG. 11 shows an Input Shift Register (ISR)

FIG. 11 shows an Input Shift Register (ISR) 1206. Data enters 1 . . . 32 bits at a time, and current contents are shifted left or right to make room. Once full, contents are written to the RX FIFO.

IN instructions shift 1 . . . 32 bits at a time into the register.

PUSH instructions write the ISR contents to the RX FIFO. The ISR is cleared to all-zeroes when pushed.

The state machine will automatically push the ISR on an IN instruction, once some shift threshold is reached, if autopush is enabled.

Shift direction is configurable by the processor via configuration registers.

Some peripherals, like UARTs, must shift in from the left to get correct bit order, since the wire order is LSB-first; however, the processor may expect the resulting byte to be right-aligned. This is solved by the special null input source, which allows the programmer to shift some number of zeroes into the ISR, following the data.

Shift Counters

State machines remember how many bits, in total, have been shifted out of the OSR via OUT instructions, and into the ISR via IN instructions. This information is tracked at all times by a pair of hardware counters, capable of holding values from 0 to 32 inclusive (the width of a shift register). The state machine can be configured to perform certain actions when the IN or OUT count reaches a configurable threshold:

The OSR can be automatically refilled once some number of bits have been shifted out.

The ISR can be automatically emptied once some number of bits have been shifted in.

PUSH or PULL instructions can be conditioned on the input or output shift counter, respectively On PIO reset, or the assertion of CTRL_SM_RESTART, the ISR shift counter is cleared to 0 (nothing yet shifted in), and the OSR shift counter is initialised to 32 (nothing remaining to be shifted out). Some other instructions affect the shift counters:

PULL clears the output shift counter

PUSH clears the input shift counter

MOV OSR, x clears the output shift counter

MOV ISR, x clears the input shift counter

OUT ISR, count sets the input shift counter to count

Scratch Registers

Each state machine has two 32-bit internal scratch registers 1203, 1204, called X and Y. They are used as:

Source/destination for IN/OUT/SET/MOV

Source for branch conditions

For example, suppose we wanted to produce a long pulse for "1" data bits, and a short pulse for "0" data bits:

https://datasheets.raspberrypi.com/rp2040/rp2040-datasheet.pdf, page 336—ws2812_led Here X is used as a loop counter, and Y is used as a temporary variable for branching on single bits from the OSR. This program can be used to drive a WS2812 LED interface, although more compact implementations are possible (as few as 3 instructions). MOV allows the use of the scratch registers to save/restore the shift registers if, for example, you would like to repeatedly shift out the same sequence.

FIFOs

Each state machine has a pair of 4-word deep FIFOs, one for data transfer from system to state machine (TX) 121*a*, and the other for state machine to system (RX) 121*b*. The TX FIFO is written to by system bus masters, such as a processor or DMA controller, and the RX FIFO is written to by the state machine. FIFOs decouple the timing of the PIO state machines and the system bus, allowing state machines to go for longer periods without processor intervention.

FIFOs also generate data request (DREQ) signals, which allow a system DMA controller to pace its reads/writes based on the presence of data in an RX FIFO, or space for new data in a TX FIFO. This allows a processor to set up a long transaction, potentially involving many kilobytes of data, which will proceed with no further processor intervention.

Often, a state machine is only transferring data in one direction. In this case the SHIFTCTRL_FJOIN option can merge the two FIFOs into a single 8-entry FIFO going in one direction only. This is useful for high-bandwidth interfaces such as DPI.

Stalling

State machines may momentarily pause execution for a number of reasons:

A WAIT instruction's condition is not yet met

A blocking PULL when the TX FIFO is empty, or a blocking PUSH when the RX FIFO is full An IRQ WAIT instruction which has set an IRQ flag, and is waiting for it to clear An OUT instruction when autopull is enabled, OSR has reached its shift threshold, and the TX FIFO is empty An IN instruction when autopush is enabled, ISR reaches its shift threshold, and the RX FIFO is full In this case, the program counter does not advance, and the state machine will continue executing this instruction on the next cycle. If the instruction specifies some number of delay cycles before the next instruction starts, these do not begin until after the stall clears.

Side-set is not affected by stalls, and always takes place on the first cycle of the attached instruction.

Pin Mapping

PIO controls the output level and direction of up to 32 GPIOs, and can observe their input levels. On every system clock cycle, each state machine may do none, one, or both of the following:

Change the level or direction of some GPIOs via an OUT or SET instruction, or read some GPIOs via an IN instruction Change the level or direction of some GPIOs via a side-set operation Each of these operations is on some contiguous range of GPIOs, with the base and count configured via each state machine's PINCTRL register. OUT, SET, IN and side-set have their own independent mappings, which are allowed to overlap.

For each individual GPIO output (level and direction separately), PIO considers all 8 writes that may have occurred on that cycle, and applies the write from the highest-numbered state machine. If the same state machine performs a SET/OUT and a side-set on the same GPIO simultaneously, the side-set is used. If no state machine writes to this GPIO output, its value does not change from the previous cycle.

Generally each state machine's outputs are mapped to a distinct group of GPIOs, implementing some peripheral interface.

IRQ Flags

IRQ flags are state bits which can be set or cleared by state machines or the system. There are 8 in total: all 8 are visible to all state machines, and the lower 4 can also be masked into one of PIO's interrupt request lines, via the IRQ0_INTE and IRQ1_INTE control registers. They have two main uses:

Asserting system level interrupts from a state machine program, and optionally waiting for the interrupt to be acknowledged Synchronising execution between two state machines State machines interact with the flags via the IRQ and WAIT instructions. Synchronising two state machines can be useful for more complex interface types. For example a VGA output can use one state machine to generate sync signals and another to provide data output.

The instruction memory is implemented as a 1-write 4-read register file, so all four state machines can read an instruction on the same cycle, without stalling.

There are three ways to apply the multiple state machines:

Pointing multiple state machines at the same program

Pointing multiple state machines at different programs

Using multiple state machines to run different parts of the same interface, e.g. TX and RX side of a UART, or clock/hsync and pixel data on a DPI display In this embodiment, state machines cannot communicate data between themselves, but they can synchronise with one another by using the IRQ flags. Omitting provision for direct communication of data between the state machines reduces their complexity. Instead data can be moved between the FIFOs using the on-chip DMA. There are 8 flags total (the lower four of which can be masked for use as system IRQs), and each state machine can set or clear any flag using the IRQ instruction, and can wait for a flag to go high or low using the WAIT IRQ instruction. This allows cycle-accurate synchronisation between state machines.

PIO Assembler (pioasm)

The PIO Assembler parses a PIO source file and outputs the assembled version ready for inclusion in a program. Pioasm currently supports output for the Pico SDK and MicroPython.

Usage

A description of the command line arguments can be obtained by running:

pioasm -?

giving:

```
usage: pioasm <options> <input> (<output>)
Assemble file of PIO program(s) for use in applications.
<input>              the input filename
<output>             the output filename (or filename prefix if
                     the output
                     format produces multiple outputs).
                     if not specified, a single output will be
                     written to stdout
options:
-o <output__format>          select output__format (default 'c-sdk');
available options are:
                     c-sdk
                       C header suitable for use with the Pico
                     SDK python
                       Python file suitable for use with
                     MicroPython hex
                       Raw hex output (only valid for single
                       program inputs)
-p <output__param>           add a parameter to be passed to the
                             outputter
-?, --help                 print this help and exit
```

Within the Pico SDK you do not need to invoke pioasm directly, as the CMake function pico_generate_pio header (TARGET PI_FTE) takes care of invoking pioasm and adding the generated header to the include path of the target TARGET for you.

Directives

Table 1 below lists pioasm directives to control the assembly of PIO programs:

TABLE 1

| | |
|---|---|
| .define ( PUBLIC ) <symbol> <value> | Define an integer symbol named <symbol> with the value <value> If this .define appears before the first program in the input file, then the define is global to all programs, otherwise it is local to the program in which it occurs. If PUBLIC is specified the symbol will be emitted into the assembled output for use by user code. For the Pico SDK this takes the form of: #define <program__name>_<symbol> value for program symbols or #define <symbol> value for global symbols |
| .program <name> | Start a new program with the name <name>. Note that that name is used in code so should be alphanumeric/underscore not starting with a digit. The program lasts until another .program directive or the end of the source file. PIO instructions are only allowed within a program |
| .origin <offset> | Optional directive to speicfy the PIO instruction memory offset at which the program must load. Most commonly this is used for programs that must load at offset 0, because they use data based JMPs with the (absolute) jmp target being stored in only a few bits. This directive is invalid outside of a program |
| .side__set <count> (opt) (pindirs) | If this directive is present, <count> indicates the number of side set bits to be used. Additionally opt may be specified to indicate that a side <value> is optional for instructions (not using this requires stealing an extra bit - in addition to the <count> bits - from those available for the instruction delay). Finally, pindirs may be specified to indicate that the side set values should be applied to the PINDIRs and not the PINs. This directive is only valid within a program before the first instruction |
| .wrap__target | Place prior to an instruction, this directive specifies the instruction where execution continues due to program wrapping. This directive is invalid outside of a program, may only be used once within a program, and if not specified defaults to the start of the program |
| .wrap | Placed after an instruction, this directive specifies the instruction after which, in normal control flow, the program wraps (to .wrap__target instruction). This directive is invalid outside of a program, may only be used once within a program, and if not specified defaults to after the last program instruction. |

TABLE 1-continued

| | |
|---|---|
| .lang_opt <lang> <name> <option> | Specifies an option for the program related to a particular language generator. This directive is invalid outside of a program |
| .word <value> | Stores a raw 16 bit value as an instruction in the program. This directive is invalid outside of a program. |

The following types of values can be used to define integer numbers or branch targets.

TABLE 2

| | |
|---|---|
| <expression> + <expression> | The sum of two expressions |
| <expression> − <expression> | The difference of two expressions |
| <expression> * <expression> | The multiplication of two expressions |
| <expression> / <expression> | The integer division of two expressions |
| − <expression> | The negation of another expression |
| :: <expression> | The bit reverse of another expression |
| <value> | Any value |

Line comments are supported with // or;
C-style block comments are supported via /* and */
Labels are of the form:
<symbol>:
or
PUBLIC <symbol>:
at the start of a line.

All pioasm instructions follow a common pattern:
<instruction> (side <side_set_value>) ([<delay_value>])
where

TABLE 3

| | |
|---|---|
| <instruction> | Is an assembly instruction detailed in the following sections. |
| <side_set_value> | Is a value to apply to the side_set pins at the start of the instruction. Note that the rules for a side set value via side <side_set_value> are dependent on the .side_set (see [pioasm_side_set]) directive for the program. If no .side_set is specified then the side <side_set_value> is invalid, if an optional number of sideset pins is specified then side <side_set_value> may be present, and if a non-optional number of sideset pins is specified, then side <side_set_value> is required. The <side_set_value> must fit within the number of side set bits specified in the .side_set directive. |
| <delay_value> | Specifies the number of cycles to delay after the instruction completes. The delay_value is specified as a value, and in general is between 0 and 31 inclusive (a 5 bit value), however the number of bits is reduced when sideset is enabled via the .side_set (see [pioasm_side_set]) directive. If the <delay_value> is not present, then the instruction has no delay |

Pioasm instruction names, keywords and directives are case insensitive; lower case is used in the Assembly Syntax sections below as this is the style used in the Pico SDK.

Commas appear in some Assembly Syntax sections below, but are entirely optional, e.g. out pins, 3 may be written out pins 3, and jmp x-- label may be written as jmp x--, label. The Assembly Syntax sections below uses the first style in each case as this is the style used in the Pico SDK.

Output Pass Through

Text in the PIO file may be passed, unmodified, to the output based on the language generator being used.

For example the following (comment and function) would be included in the generated header when the default c-sdk language generator is used.

```
% c-sdk #
// an inline function (since this is going in a header file)
```

-continued

```
static inline int some_c_code( ) #
   return 0;
```

The general format is

```
% target #
pass thru contents
%#
```

with targets being recognized by a particular language generator (note that target is usually the language generator name e.g. c-sdk, but could potentially be some_language.some_some_group if the language generator supports different classes of pass thru with different output locations.

This facility allows you to encapsulate both the PIO program and the associated setup required in the same source file.

Language Generators

The following example shows a multi program source file (with multiple programs) which we will use to highlight c-sdk and python output features Pico Examples:

https://github.com/raspberrypi/pico-examples/blob/master/pio/ws2812/ws2812.pio

The c-sdk language generator produces a single header file with all the programs in the PIO source file:

The pass thru sections (% c-sdk #) are embedded in the output, and the PUBLIC defines are available via #define.

A method is created for each program (e.g. s2812_program_get_default_configo) which sets up a pio_sm_config based on the .side_set, .wrap and wrap_target settings of the program, which you can then use as a basis for configuration the PIO state machine.

https://github.com/raspberrypi/pico-examples/blob/master/pio/ws2812/generated/ws2812.pio.h The python language generator produces a single python file with all the programs in the PIO source file. The pass thru sections (% python #) would be embedded in the output, and the PUBLIC defines are available as python variables. Also note the use of .lang_opt python to pass initializers for the @pico.asm_pio decorator.

The python language output is provided as a utility. MicroPython supports programming with the PIO natively, so you may only want to use pioasm when sharing PIO code between the Pico SDK and MicroPython. No effort is currently made to preserve label names, symbols or comments, as it is assumed you are either using the PIO file as a source or python; not both. The python language output can of course be used to bootstrap your MicroPython PIO development based on an existing PIO file.

https://github.com/raspberrypi/pico-examples/blob/master/pio/ws2812/generated/ws2812.pio.h The hex generator only supports a single input program, as it just dumps the raw instructions (one per line) as a 4 bit hexidecimal number. Given the program referenced below:

https://github.com/raspberrypi/pico-examples/blob/master/pio/squarewave/squarewave.pio The hex output produced is detailed at:

https://github.com/raspberrypi/pico-examples/blob/master/pio/squarewave/generated/squarewave.hex Instruction Set Summary PIO instructions are 16 bits long, and have the following encoding:

TABLE 4

| Bit: | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| JMP | 0 | 0 | 0 | Delay/side-set | | | | | Condition | | | Address | | | | |
| WAIT | 0 | 0 | 1 | Delay/side-set | | | | | Pct | Source | | Index | | | | |
| IN | 0 | 1 | 0 | Delay/side-set | | | | | Source | | | Bit count | | | | |
| OUT | 0 | 1 | 1 | Delay/side-set | | | | | Destination | | | Bit count | | | | |
| PUSH | 1 | 0 | 0 | Delay/side-set | | | | | 0 | IfF | Blk | 0 | 0 | 0 | 0 | 0 |
| PULL | 1 | 0 | 0 | Delay/side-set | | | | | 1 | IfE | Blk | 0 | 0 | 0 | 0 | 0 |
| MOV | 1 | 0 | 1 | Delay/side-set | | | | | Destination | | | Op | | Source | | |
| IRQ | 1 | 1 | 0 | Delay/side-set | | | | | 0 | Clr | Wait | Index | | | | |
| SET | 1 | 1 | 1 | Delay/side-set | | | | | Destination | | | Data | | | | |

All PIO instructions execute in one clock cycle.

The Delay/side-set field is present in all instructions. Its exact use is configured for each state machine by PINCTRL_SIDESET_COUNT:

- Up to 5 MSBs encode a side-set operation, which optionally asserts a constant value onto some GPIOs, concurrently with main instruction execution logic
- Remaining LSBs (up to 5) encode the number of idle cycles inserted between this instruction and the next The instructions are described further below in turn.

JMP

TABLE 5

| Bit: | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| JMP | 0 | 0 | 0 | Delay/side-set | | | | | Condition | | | Address | | | | |

Operation: et program counter to Address i Condition is true, otherwise no operation.

Delay cycles on a JMP always take effect, whether Condition is true or false, and they take place after Condition is evaluated and the program counter is updated.

Condition:

- 000: (no condition): Always
- 001: !X: scratch X zero
- 010: X--: scratch X non-zero, post-decrement
- 011: !Y: scratch Y zero
- 100: Y--: scratch Y non-zero, post-decrement
- 101: X!=Y: scratch X not equal scratch Y
- 110: PIN: branch on input pin
- 111: !OSRE: output shift register not empty Address: Instruction address to jump to. In the instruction encoding this is an absolute address within the PIO instruction memory.

JMP PIN branches on the GPIO selected by EXECCTRL_JMP_PIN. The branch is taken if the GPIO is high.
!OSRE compares the bits shifted out since the last PULL with the shift count threshold configured by SHIFTCTRL_PULL_THRESH.
This is the same threshold used by autopull.
Assembler Syntax

| | |
|---|---|
| jmp ( <cond> ) <target> | |
| where: | |
| <cond> | Is an optional condition listed above (e.g. !x for scratch X zero). If a condition code is not specified, the branch is always taken |
| <target> | Is a program label or value representing instruction offset within the program (the first instruction being offset 0). Note that because the PIO JMP instruction uses absolute addresses in the PIO instruction memory, JMPs need to be adjusted based on the program load offset at runtime. This is handled for you when loading a program with the Pico SDK, but care should be taken when encoding JMP instructions for use by OUT EXEC |

WAIT

TABLE 6

| Bit: | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|
| WAIT | 0 | 0 | 1 | | Delay/side-set | | | | Pol | Source | | | Index | | |

Operation: Stall until some condition is met. Like all stalling instructions, delay cycles begin after the instruction completes. That is, if any delay cycles are present, they do not begin counting until after the wait condition is met.

Polarity:

01: wait for a 1.

0: wait for a 0.

Source: what to wait on. Values are:

00: GPIO: System GPIO input selected by Index. This is an absolute GPIO index, and is not affected by the state machine's input IO mapping.

01: PIN: Input pin selected by Index. This state machine's input IO mapping is applied first, and then Index selects which of the mapped bits to wait on.

10: IRQ: PIO IRQ flag selected by Index

11: Reserved

Index: which pin or bit to check.

WAIT x IRQ behaves slightly differently from other WAIT sources:

If Polarity is 1, the selected IRQ flag is cleared by the state machine upon the wait condition being met.

The flag index is decoded in the same way as the IRQ index field: if the MSB is set, the state machine ID (0 . . . 3) is added to the IRQ index, by way of modulo-4 addition on the two LSBs. For example, state machine 2 with a flag value of '0x11' will wait on flag 3, and a flag value of '0x13' will wait on flag 1. This allows multiple state machines running the same program to synchronise with each other.

WAIT 1 IRQ x should not be used with IRQ flags presented to the interrupt controller, to avoid a race condition with a system interrupt handler.

Assembler Syntax

| | |
|---|---|
| wait <polarity> gpio <gpio_num> | |
| wait <polarity> pin <pin_num> | |
| wait <polarity> irq <irq_num> ( rel ) | |
| where: | |
| <polarity> | Is a value specifying the polarity (either 0 or 1) |
| <pin_num> | Is a value specifying the input pin number (as mapped by the SM input pin mapping) |
| <gpio_num> | Is a value specifying the actual GPIO pin number |
| <irq_num> ( rel ) | Is a value specifying The irq number to wait on (0-7). If rel is present, then the actual irq number used is calculating by replacing the low two bits of the irq number (irq_num10) with the low two bits of the sum (irq_num10 + sm_num10) where sm_num10 is the state machine number |

TABLE 7

| Bit: | 15 | 14 | 13 | 12 | 11 | 10 | 9 8 | 7 | 6 | 5 | 4 3 2 1 0 |
|---|---|---|---|---|---|---|---|---|---|---|---|
| IN | 0 | 1 | 0 | | Delay/side-set | | | | Source | | Bit count |

Operation: Shift Bit count bits from Source into the Input Shift Register (ISR). Shift direction is configured for each state machine by SHIFTCTRL_IN_SHIFTDIR. Additionally, increase the input shift count by Bit count, saturating at 32.

Source:

000: PINS

001: X (scratch register X)

010: Y (scratch register Y)

011: NULL (all zeroes)

100: Reserved

101: Reserved

110: ISR

111: OSR

Bit count: How many bits to shift into the ISR. 1 . . . 32 bits, 32 is encoded as 00000.

If automatic push is enabled, IN will also push the ISR contents to the RX FIFO if the push threshold is reached (SHIFTCTRL_PUSH_THRESH). IN still executes in one cycle, whether an automatic push takes place or not. The state machine will stall if the RX FIFO is full when an automatic push occurs. An automatic push clears the ISR contents to all-zeroes, and clears the input shift count.

IN always uses the least significant Bit count bits of the source data. For example, if PINCTRL_IN_BASE is set to 5, the instruction IN 3, PINS will take the values of pins 5, 6 and 7, and shift these into the ISR. First the ISR is shifted to the left or right to make room for the new input data, then the input data is copied into the gap this leaves. The bit order of the input data is not dependent on the shift direction.

NULL can be used for shifting the ISR's contents. For example, UARTs receive the LSB first, so must shift to the right. After 8 IN PINS, 1 instructions, the input serial data will occupy bits 31 . . . 24 of the ISR. An IN NULL, 24 instruction will shift in 24 zero bits, aligning the input data at ISR bits 7 . . . 0. Alternatively, the processor or DMA could perform a byte read from FIFO address+3, which would take bits 31 . . . 24 of the FIFO contents.

Assembler Syntax in <source>, <bit_count> where:

<source> Is one of the sources specified above.

<bit_count> Is a value specifying the number of bits to shift (valid range 1-32)

OUT

TABLE 8

| Bit: | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| OUT | 0 | 1 | 1 | Delay/side-set | | | | | Destination | | | Bit count | | | | |

Operation: Shift Bit count bits out of the Output Shift Register (OSR), and write those bits to Destination. Additionally, increase the output shift count by Bit count, saturating at 32.

Destination:

000: PINS
001: X (scratch register X)
010: Y (scratch register Y)
011: NULL (discard data)
100: PINDIRS
101: PC
110: ISR (also sets ISR shift counter to Bit count)
111: EXEC (Execute OSR shift data as instruction)

Bit count: how many bits to shift out of the OSR. 1 . . . 32 bits, 32 is encoded as 00000.

A 32-bit value is written to Destination: the lower Bit count bits come from the OSR, and the remainder are zeroes. This value is the least significant Bit count bits of the OSR if SHIFTCTRL_OUT_SHIFTDIR is to the right, otherwise it is the most significant bits.

PINS and PINDIRS use the OUT pin mapping.

If automatic pull is enabled, the OSR is automatically refilled from the TX FIFO if the pull threshold, SHIFTCTRL_PULL_THRESH, is reached. The output shift count is simultaneously cleared to 0. In this case, the OUT will stall if the TX FIFO is empty, but otherwise still executes in one cycle. The specifics are given in section Section 3.5.4.

OUT EXEC allows instructions to be included inline in the FIFO datastream. The OUT itself executes on one cycle, and the instruction from the OSR is executed on the next cycle. There are no restrictions on the types of instructions which can be executed by this mechanism. Delay cycles on the initial OUT are ignored, but the executee may insert delay cycles as normal.

OUT PC behaves as an unconditional jump to an address shifted out from the OSR.

Assembler Syntax out <destination>, <bit_count> where:

<destination> Is one of the destinations specified above.

<bit_count> Is a value specifying the number of bits to shift (valid range 1-32)

PUSH

TABLE 9

| Bit: | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| PUSH | 1 | 0 | 0 | Delay/side-set | | | | | 0 | IfF | Blk | 0 | 0 | 0 | 0 | 0 |

Operation: Push the contents of the ISR into the RX FIFO, as a single 32-bit word. Clear ISR to all-zeroes.

If Full (IfF): If 1, do nothing unless the total input shift count has reached its threshold, SHIFTCTRL_PUSH_THRESH (the same as for autopush).

Block: If 1, stall execution if RX FIFO is full.

PUSH IFFULL helps to make programs more compact, like autopush. It is useful in cases where the IN would stall at an inappropriate time if autopush were enabled, e.g. if the state machine is asserting some external control signal at this point.

Assembler Syntax push (iffull)
push (iffull) block
push (iffull) noblock where:

iffull Is equivalent to IfFull==1 above. i.e. the default if this is not specified is IfFull==0 block Is equivalent to Block==1 above. This is the default if neither block nor noblock are specified noblock Is equivalent to Block==0 above.

PULL

TABLE 10

| Bit: | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| PULL | 1 | 0 | 0 | Delay/side-set | | | | | 1 | IfE | Blk | 0 | 0 | 0 | 0 | 0 |

Operation: Load a 32-bit word from the TX FIFO into the OSR.

If Empty (IfE): If 1, do nothing unless the total output shift count has reached its threshold, SHIFTCTRL_PULL_THRESH (the same as for autopull).

Block: If 1, stall if TX FIFO is empty. If 0, pulling from an empty FIFO copies scratch X to OSR.

Some peripherals (UART, SPI . . . ) should halt when no data is available, and pick it up as it comes in; others (I2S) should clock continuously, and it is better to output placeholder or repeated data than to stop clocking. This can be achieved with the Block parameter.

A nonblocking PULL on an empty FIFO has the same effect as MOV OSR, X. The program can either preload scratch register X with a suitable default, or execute a MOV X, OSR after each PULL NOBLOCK, so that the last valid FIFO word will be recycled until new data is available.

PULL IFEMPTY is useful if an OUT with autopull would stall in an inappropriate location when the TX FIFO is empty. For example, a UART transmitter should not stall immediately after asserting the start bit. IfEmpty permits some of the same program simplifications as autopull, but the stall occurs at a controlled point in the program.

Assembler Syntax pull (ifempty)

pull (ifempty) block pull (ifempty) noblock where:

ifempty Is equivalent to IfEmpty==1 above. i.e. the default if this is not specified is IfEmpty==0 block Is equivalent to Block==1 above. This is the default if neither block nor noblock are specified.

noblock Is equivalent to Block==0 above.

MOV

TABLE 11

| Bit: | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| MOV | 1 | 0 | 1 | Delay/side-set | | | | | Destination | | | Op | | Source | | |

Operation: Copy data from Source to Destination.

Destination:
- 000: PINS (Uses same pin mapping as OUT)
- 001: X (Scratch register X)
- 010: Y (Scratch register Y)
- 011: Reserved
- 100: EXEC (Execute data as instruction)
- 101: PC
- 110: ISR (Input shift counter is reset to 0 by this operation, i.e. empty)
- 111: OSR (Output shift counter is reset to 0 by this operation, i.e. full)

Operation:
- 00: None
- 01: Invert (bitwise complement)
- 10: Bit-reverse
- 11: Reserved Source:
- 000: PINS (Uses same pin mapping as IN)
- 001: X
- 010: Y
- 011: NULL
- 100: Reserved
- 101: STATUS
- 110: ISR
- 111: OSR MOV PC causes an unconditional jump. MOV EXEC has the same behaviour as OUT EXEC (section Section 3.4.5), and allows register contents to be executed as an instruction. The MOV itself executes in 1 cycle, and the instruction in Source on the next cycle. Delay cycles on MOV EXEC are ignored, but the executee may insert delay cycles as normal.

The STATUS source has a value of all-ones or all-zeroes, depending on some state machine status such as FIFO full/empty, configured by EXECCTRL_STATUS_SEL.

MOV can manipulate the transferred data in limited ways, specified by the Operation argument. Invert sets each bit in Destination to the logical NOT of the corresponding bit in Source, i.e. 1 bits become 0 bits, and vice versa. Bit reverse sets each bit n in Destination to bit 31-n in Source, assuming the bits are numbered 0 to 31.

Assembler Syntax mov <destination>, (op)<source> where:

<destination> Is one of the destinations specified above.

<op> If present, is:

! or ~ for NOT (Note: this is always a bitwise NOT)

:: for bit reverse

<source> Is one of the sources specified above.

IRQ

TABLE 12

| Bit: | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| IRQ | 1 | 1 | 0 | Delay/side-set | | | | | 0 | Clr | Wait | Index | | | | |

Operation: Set or clear the IRQ flag selected by Index argument.

Clear: if 1, clear the flag selected by Index, instead of raising it. If Clear is set, the Wait bit has no effect.

Wait: if 1, halt until the raised flag is lowered again, e.g. if a system interrupt handler has acknowledged the flag.

Index:

The 3 LSBs specify an IRQ index from 0-7. This IRQ flag will be set/cleared depending on the Clear bit.

If the MSB is set, the state machine ID (0 . . . 3) is added to the IRQ index, by way of modulo-4 addition on the two LSBs. For example, state machine 2 with a flag value of 0x11 will raise flag 3, and a flag value of 0x13 will raise flag 1.

IRQ flags 4-7 are visible only to the state machines; IRQ flags 0-3 can be routed out to system level interrupts, on either of the PIO's two external interrupt request lines, configured by IRQ0_INTE and IRQ1_INTE.

The modulo addition bit allows relative addressing of 'IRQ' and 'WAIT' instructions, for synchronising state machines which are running the same program. Bit 2 (the third LSB) is unaffected by this addition.

If Wait is set, Delay cycles do not begin until after the wait period elapses.

Assembler Syntax irq <irq_num>(_rel)

irq set <irq_num>(_rel)

irq nowait <irq_num>(_rel)

irq wait <irq_num>(rel)

irq clear <irq_num>(rel)

where:

irq <irq_num>(rel) Is a value specifying The irq number to wait on (0-7). If rel is present, then the actual irq number used is calculating by replacing the low two bits of the irq number (irq_num10) with the low two bits of the sum (irq_num10+sm_num10) where sm_num10 is the state machine number irq Means set the IRQ without waiting irq set Also means set the IRQ without waiting irq nowait Again, means set the IRQ without waiting irq wait Means set the IRQ and wait for it to be cleared before proceeding irq clear Means clear the IRQ

SET

TABLE 13

| Bit: | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| SET | 1 | 1 | 1 | Delay/side-set | | | | | Destination | | | Data | | | | |

Operation: Write immediate value Data to Destination.

Destination:

000: PINS

001: X (scratch register X) 5 LSBs are set to Data, all others cleared to 0.

010: Y (scratch register Y) 5 LSBs are set to Data, all others cleared to 0.

011: Reserved

100: PINDIRS

101: Reserved

110: Reserved

111: Reserved

Data: 5-bit immediate value to drive to pins or register.

This can be used to assert control signals such as a clock or chip select, or to initialise loop counters. As Data is 5 bits in size, scratch registers can be SET to values from 0-31, which is sufficient for a 32-iteration loop.

The mapping of SET and OUT onto pins is configured independently. They may be mapped to distinct locations, for example if one pin is to be used as a clock signal, and another for data. They may also be overlapping ranges of pins: a UART transmitter might use SET to assert start and stop bits, and OUT instructions to shift out FIFO data to the same pins.

Assembler Syntax set <destination>, <value> where:

<destination> Is one of the destinations specified above.

<value> The value to set (valid range 0-31)

Side-Set

Side-set is a feature that allows state machines to change the level or direction of up to 5 pins, concurrently with the main execution of the instruction. One example where this is desirable is a fast SPI interface: here a clock transition toggling 1→0 or 0→1) must be simultaneous with a data transition, where a new data bit is shifted from the OSR to a GPIO. In this case an OUT with a side-set would achieve both of these at once.

Side-set makes the timing of the interface more precise, reduces the overall program size (as a separate SET instruction is not needed to toggle the clock pin), and also increases the maximum frequency the SPI can run at.

Side-set also makes GPIO mapping much more flexible, as its mapping is independent from SET. For example, SDA and SCL can be mapped to any two arbitrary pins. Normally, SCL toggles to synchronise data transfer, and SDA contains the data bits being shifted out. However, some particular I2C sequences such as Start and Stop line conditions, need a fixed pattern to be driven on SDA as well as SCL. The mapping I2C uses to achieve this is:

Side-set→SCL

OUT→SDA

SET→SDA

This lets the state machine serve the two use cases of data on SDA and clock on SCL, or fixed transitions on both SDA and SCL, while still allowing SDA and SCL to be mapped to any two GPIOs of choice.

The side-set data is encoded in the Delay/side-set field of each instruction. Any instruction can be combined with side-set, including instructions which write to the pins, such as OUT PINS or SET PINS. Side-set's pin mapping is independent from OUT and SET mappings, though it may overlap. If side-set and an OUT or SET write to the same pin simultaneously, the side-set data is used.

If an instruction stalls, the side-set still takes effect immediately.

https://datasheets.raspberrypi.com/rp2040/rp2040-datasheet.pdf, page 351—spi_tx_fast The spi_tx_fast example shows two benefits of this: data and clock transitions can be more precisely co-aligned, and programs can be made faster overall, with an output of one bit per two system clock cycles in this case. Programs can also be made smaller.

There are four things to configure when using side-set:

1. The number of MSBs of the Delay/side-set field to use for side-set rather than delay. This is configured by PINCTRL_SIDESET_COUNT. If this is set to 5, delay cycles are not available. If set to 0, no side-set will take place.
2. Whether to use the most significant of these bits as an enable. Side-set takes place on instructions where the enable is high. If there is no enable bit, every instruction on that state machine will perform a side-set, if SIDESET_COUNT is nonzero. This is configured by EXECCTRL_SIDE_EN.
3. The GPIO number to map the least-significant side-set bit to. Configured by PINCTRL_SIDESET_BASE.
4. Whether side-set writes to GPIO levels or GPIO directions. Configured by EXECCTRL_SIDE_PINDIR In the above example, we have only one side-set data bit, and every instruction performs a side-set, so no enable bit is required. SIDESET_COUNT would be 1, SIDE_EN would be false. SIDE_PINDIR would also be false, as we want to drive the clock high and low, not high- and low-impedance. SIDESET_BASE would select the GPIO the clock is driven from.

Program Wrapping

PIO programs often have an "outer loop": they perform the same sequence of steps, repetitively, as they transfer a stream of data between the FIFOs and the outside world. The square wave program from the introduction (https://github.com/raspberrypi/pico-examples/blob/master/pio/squarewave/squarewave.pio) is a minimal example of this.

The main body of the program drives a pin high, and then low, producing one period of a square wave. The entire program then loops, driving a periodic output. The jump itself takes one cycle, as does each set instruction, so to keep the high and low periods of the same duration, the set pins, 1 has a single delay cycle added, which makes the state machine idle for one cycle before executing the set pins, 0 instruction. In total, each loop takes four cycles. There are two frustrations here:

The IMP takes up space in the instruction memory that could be used for other programs The extra cycle taken to execute the JMP ends up halving the maximum output rate As the Program Counter (PC) naturally wraps to 0 when incremented past 31, we could solve the second of these by filling the entire instruction memory with a repeating pattern of set pins, 1 and set pins, 0, but this is wasteful. State machines have a hardware feature, configured via their EXECCTRL control register, which solves this common case.

https://github.com/raspberrypi/pico-examples/blob/master/pio/squarewave/squarewave_wrap.pio After executing an instruction from the program memory, state machines use the following logic to update PC:

1. If the current instruction is a JMP, and the Condition is true, set PC to the Target
2. Otherwise, if PC matches EXECCTRL_WRAP_TOP, set PC to EXECCTRL_WRAP_BOTTOM
3. Otherwise, increment PC, or set to 0 if the current value is 31.

The .wrap_target and .wrap assembly directives are essentially labels. They export constants which can be written to the WRAP_BOTTOM and WRAP_TOP control fields, respectively:

https://github.com/raspberrypi/pico-examples/blob/master/pio/squarewave/generated/squarewave/wrap.pio.h The squarewave_wrap example has delay cycles inserted, so that it behaves identically to the original squarewave program. Thanks to program wrapping, these can be removed, so that the output toggles twice as fast, while maintaining an even balance of high and low periods:

https://github.com/raspberrypi/pico-examples/blob/master/pio/squarewave/squarewave/fast.pio FIFO Joining By default, each state machine possesses a 4-entry FIFO in each direction: one for data transfer from system to state machine (TX), the other for the reverse direction (RX). However, many applications do not require bidirectional data transfer between the system and an individual state machine, but may benefit from deeper FIFOs: in particular, high-bandwidth interfaces such as DPI. For these cases, SHIFTCTRL_FJOIN can merge the two 4-entry FIFOs into a single 8-entry FIFO.

Figure 12:
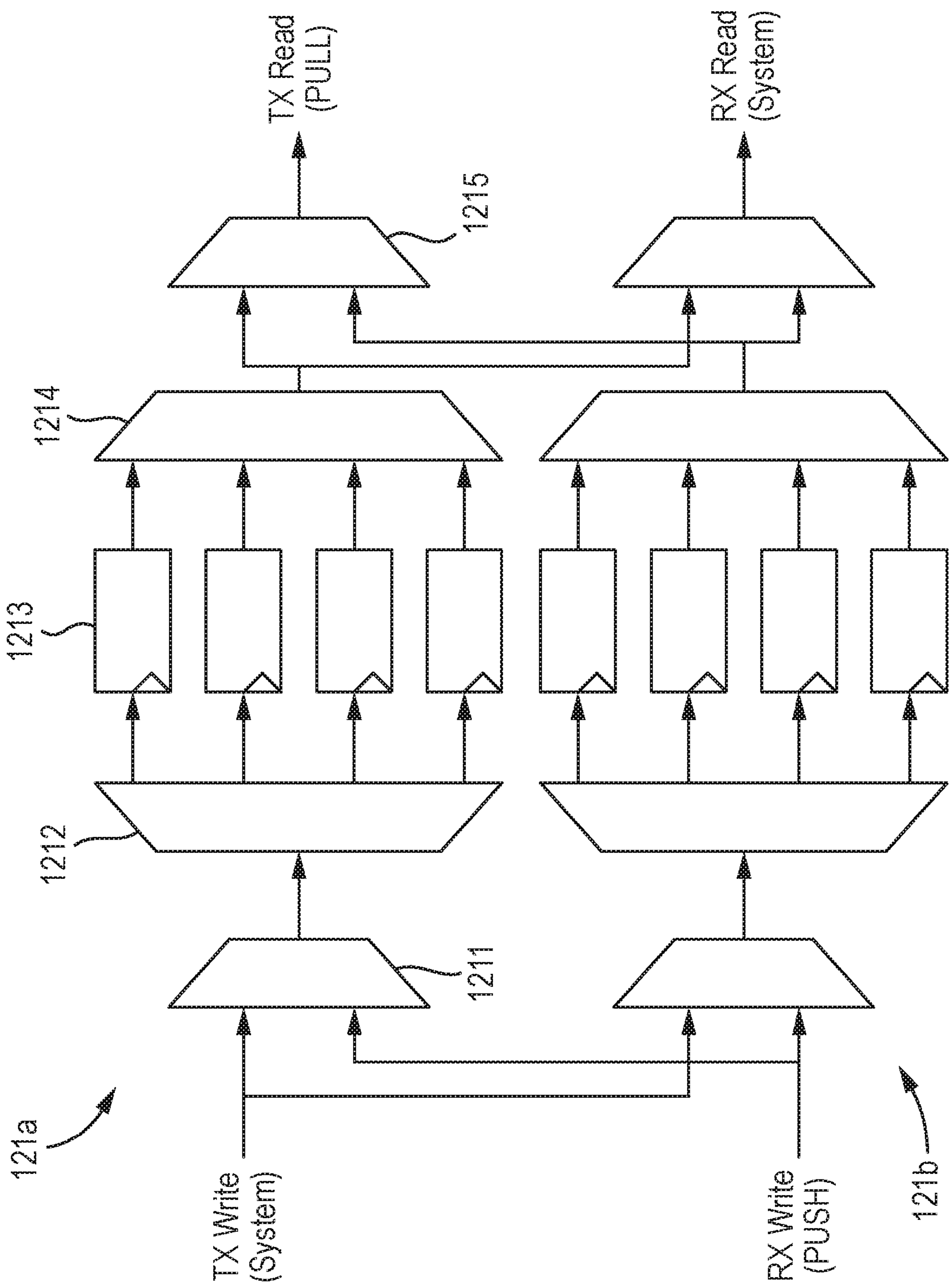
FIG. 12 shows a joinable dual FIFO.

FIG. 12 is a schematic diagram of a joinable dual FIFO. A pair of four-entry FIFOs 121*a,b*, implemented with four data registers 1213, a 1:4 decoder 1212 and a 4:1 multiplexer 1214. Additional multiplexing 1211, 1215 allows write data and read data to cross between the TX and RX lanes, so that all 8 entries are accessible from both ports.

By default, each state machine possesses a 4-entry FIFO in each direction: one for data transfer from system to state machine (TX), the other for the reverse direction (RX). However, many applications do not require bidirectional data transfer between the system and an individual state machine, but may benefit from deeper FIFOs: in particular, high-bandwidth interfaces such as DPI. For these cases, SHIFTCTRL_FJOIN can merge the two 4-entry FIFOs into a single 8-entry FIFO.

Another example is a UART: because the TX/CTS and RX/RTS parts a of a UART are asynchronous, they are implemented on two separate state machines. It would be wasteful to leave half of each state machine's FIFO resources idle. The ability to join the two halves into just a TX FIFO for the TX/CTS state machine, or just an RX FIFO in the case of the RX/RTS state machine, allows full utilisation. A UART equipped with an 8-deep FIFO can be left alone for twice as long between interrupts as one with only a 4-deep FIFO.

The area and power footprint of this whole FIFO arrangement is nearly identical to a single 8-deep FIFO, but this design covers many more use cases.

When one FIFO is increased in size (from 4 to 8), the other FIFO on that state machine is reduced to zero. For example, if joining to TX, the RX FIFO is unavailable, and any PUSH instruction will stall. The RX FIFO will appear both RXFULL and RXEMPTY in the FSTAT register. The converse is true if joining to RX: the TX FIFO is unavailable, and the TXFULL and TXEMPTY bits for this state machine will both be set in FSTAT.

8 FIFO entries is sufficient for 1 word per clock through the RP2040 system DMA, provided the DMA is not slowed by contention with other masters.

Changing FJOIN discards any data present in the state machine's FIFOs. If this data is irreplaceable, it must be drained beforehand.

Autopush and Autopull

Figure 13:
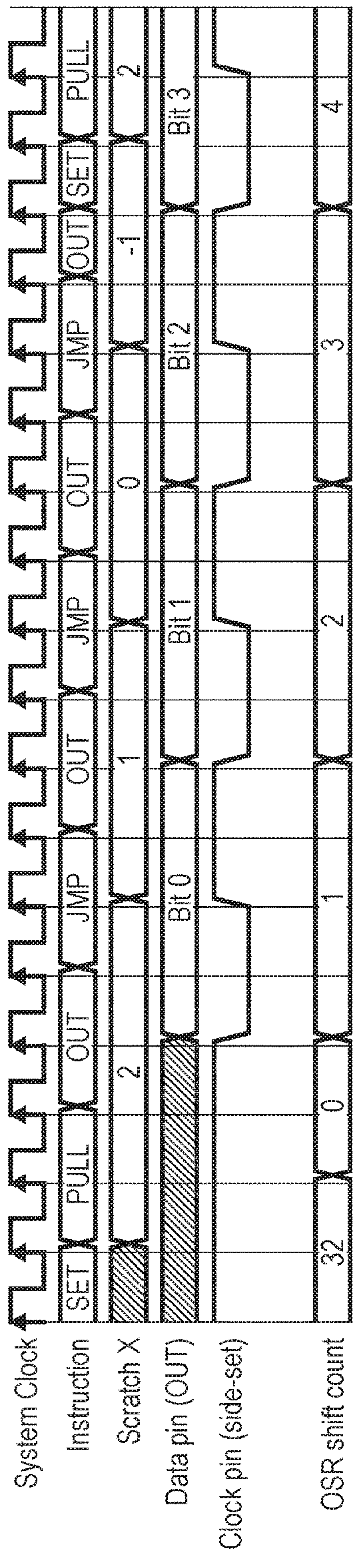
FIG. 13 illustrates execution of manual_pull program.

With each OUT instruction, the OSR gradually empties, as data is shifted out. Once empty, it must be refilled: for example, a PULL transfers one word of data from the TX FIFO to the OSR. Similarly, the ISR must be emptied once full. One approach to this is a loop which performs a PULL after an appropriate amount of data has been shifted:

https://datasheets.raspberrypi.com/rp2040/rp2040-datasheet.pdf, page 354—manual_pull This program shifts out 4 bits from each FIFO word, with an accompanying bit clock, at a constant rate of 1 bit per 4 cycles. When the TX FIFO is empty, it stalls with the clock high (noting that side-set still takes place on cycles where the instruction stalls). FIG. 13 shows how a state machine would execute this program.

FIG. 13 illustrates execution of manual_pull program. X is used as a loop counter. On each iteration, one data bit is shifted out, and the clock is asserted low, then high. A delay cycle on each instruction brings the total up to four cycles per iteration. After the third loop, a fourth bit is shifted out, and the state machine immediately returns to the start of the program to reload the loop counter and pull fresh data, while maintaining the 4 cycles/bit cadence.

This program has some limitations:

It occupies 5 instruction slots, but only 2 of these are immediately useful (out pins, 1 set 0 and . . . set 1), for outputting serial data and a clock.

Its throughput is limited to system clock over 4, due to the extra cycles required to pull in new data, and reload the loop counter.

This is a common type of problem for PIO, so each state machine has some extra hardware to handle it. State machines keep track of the total shift count OUT of the OSR and IN to the ISR, and trigger certain actions once these counters reach a programmable threshold.

On an OUT instruction which reaches or exceeds the pull threshold, the state machine can simultaneously refill the OSR from the TX FIFO, if data is available.

On an IN instruction which reaches or exceeds the push threshold, the state machine can write the shift result directly to the RX FIFO, and clear the ISR.

The manual_pull example can be rewritten to take advantage of automatic pull (autopull):

https://datasheets.raspberrypi.com/rp2040/rp2040-datasheet.pdf, page 355—autopull This is shorter and simpler than the original, and can run twice as fast, if the delay cycles are removed, since the hardware refills the OSR "for free". Note that the program does not determine the total number of bits to be shifted before the next pull; the hardware automatically pulls once the programmable threshold, SHIFCTRL_PULL_THRESH, is reached, so the same program could also shift out e.g. 16 or 32 bits from each FIFO word.

Figure 14:
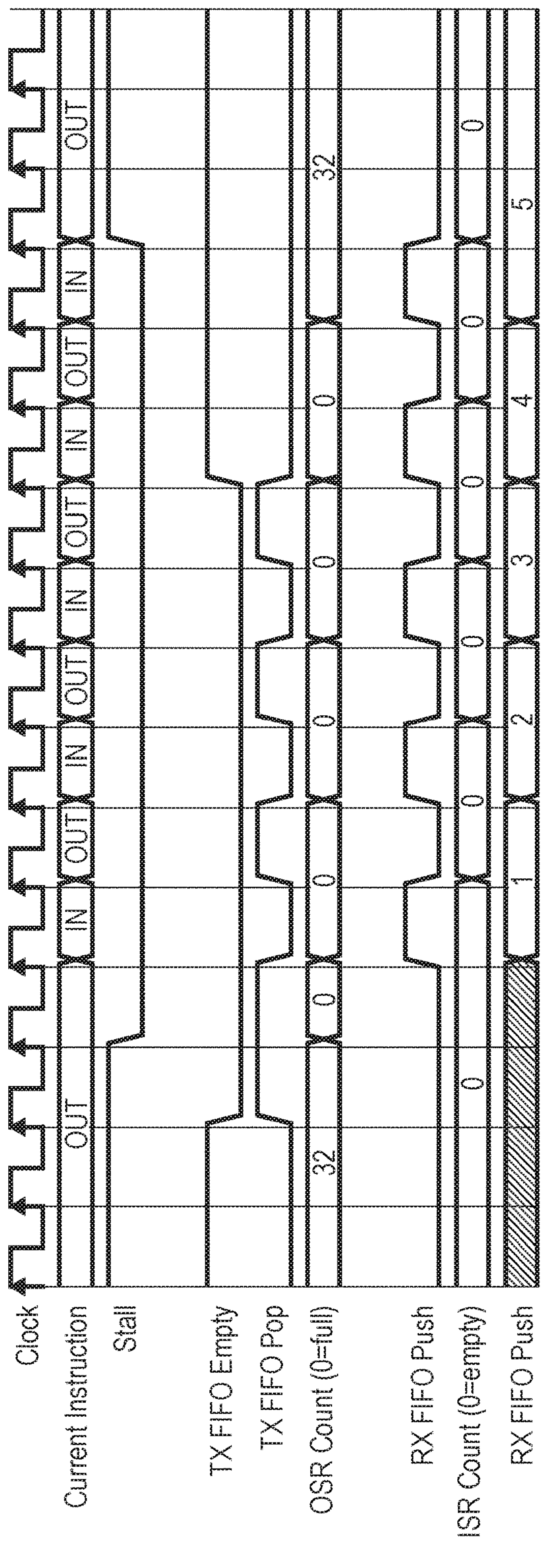
FIG. 14 shows how a state machine executes an example program.

Finally, note that the above program is not exactly the same as the original, since it stalls with the clock output low, rather 3.5. than high. We can change the location of the stall, using the PULL IFEMPTY instruction, which uses the same configurable threshold as autopull:

https://datasheets.raspberrypi.com/rp2040/rp2040-datasheet.pdf, page 355—somewhat_manual_pull Below is a complete example (PIO program, plus a C program to load and run it) which illustrates autopull and autopush both enabled on the same state machine. It programs state machine 0 to loopback data from the TX FIFO to the RX FIFO, with a throughput of one word per two clocks. It also demonstrates how the state machine will stall if it tries to OUT when both the OSR and TX FIFO are empty.

https://datasheets.raspberrypi.com/rp2040/rp2040-datasheet.pdf, page 356—auto_push_pull FIG. 14 shows how the state machine executes the example program. Initially the OSR is empty, so the state machine stalls on the first OUT instruction. Once data is available in the TX FIFO, the state machine transfers this into the OSR. On the next cycle, the OUT can execute using the data in the OSR (in this case, transferring this data to the X scratch register), and the state machine simultaneously refills the OSR with fresh data from the FIFO. Since every IN instruction immediately fills the ISR, the ISR remains empty, and IN transfers data directly from scratch X to the RX FIFO.

To trigger automatic push or pull at the correct time, the state machine tracks the total shift count of the ISR and OSR, using a pair of saturating 6 bit counters.

At reset, or upon CTRL_SM_RESTART assertion, ISR shift counter is set to 0 (nothing shifted in), and OSR to 32 (nothing left to be shifted out)

An OUT instruction increases the OSR shift counter by Bit count

An IN instruction increases the ISR shift counter by Bit count

A PULL instruction or autopull clears the OSR counter to 0

A PUSH instruction or autopush clears the ISR counter to 0

A MOV OSR, x or MOV ISR, x clears the OSR or ISR shift counter to 0, respectively A OUT ISR, n instruction sets the ISR shift counter to n On any OUT or IN instruction, the state machine compares the shift counters to the values of SHIFTCTRL_PULL_THRESH and SHIFTCTRL_PUSH_THRESH to decide whether action is required. Autopull and autopush are individually enabled by the SHIFTCTRL_AUTOPULL and SHIFTCTRL_AUTOPUSH fields.

Autopush Details

Pseudocode for an 'IN' with autopush enabled can be found at:

https://datasheets.raspberrypi.com/rp2040/rp2040-datasheet.pdf, page 357

Note that the hardware performs the above steps in a single machine clock cycle (unless there is a stall). Threshold is configurable from 1 to 32.

Autopull Details

On non-'OUT' cycles, the hardware performs the equivalent of the following referenced pseudocode:

https://datasheets.raspberrypi.com/rp2040/rp2040-datasheet.pdf, page 358

An autopull can therefore occur at any point between two 'OUT' s, depending on when the data arrives in the FIFO. On 'OUT' cycles, the sequence is a little different:

https://datasheets.raspberrypi.com/rp2040/rp2040-datasheet.pdf, page 358

The hardware is capable of refilling the OSR simultaneously with shifting out the last of the shift data, as these two operations can proceed in parallel. However, it cannot fill an empty OSR and 'OUT' it on the same cycle, due to the long logic path this would create.

The refill is somewhat asynchronous to your program, but an 'OUT' behaves as a data fence, and the state machine will never 'OUT' data which you didn't write into the FIFO.

Note that a 'MOV' from the OSR is undefined whilst autopull is enabled; you will read either any residual data that has not been shifted out, or a fresh word from the FIFO, depending on a race against system DMA. Likewise, a 'MOV' to the OSR may overwrite data which has just been autopulled. However, data which you 'MOV' into the OSR will never be overwritten, since 'MOV' updates the shift counter.

If you do need to read the OSR contents, you should perform an explicit 'PULL' of some kind. The nondeterminism described above is the cost of the hardware managing pulls automatically. When autopull is enabled, the behaviour of 'PULL' is altered: it becomes a no-op if the OSR is full. This is to avoid a race condition against the system DMA. It behaves as a fence: either an autopull has already taken place, in which case the 'PULL' has no effect, or the program will stall on the 'PULL' until data becomes available in the FIFO.

'PUSH' does not need a similar behaviour, because autopush does not have the same nondeterminism.

Clock Dividers

PIO runs off the system clock, but this is simply too fast for many interfaces, and the number of Delay cycles which can be inserted is limited. Some devices, such as UART, require the signalling rate to be precisely controlled and varied, and ideally multiple state machines can be varied independently while running identical programs. Each state machine is equipped with a clock divider, for this purpose. It would be possible to share clock dividers between state machines.

Rather than slowing the system clock itself, the clock divider redefines how many system clock periods are considered to be "one cycle", for execution purposes. It does this by generating a clock enable signal, which can pause and resume execution on a per-system-clock-cycle basis. The clock divider generates clock enable pulses at regular intervals, so that the state machine runs at some steady pace, potentially much slower than the system clock.

Implementing the clock dividers in this way allows interfacing between the state machines and the system to be simpler, lower-latency, and with a smaller footprint. The state machine is completely idle on cycles where clock enable is low, though the system can still access the state machine's FIFOs and change its configuration.

The clock dividers are 16-bit integer, 8-bit fractional, with first-order delta-sigma for the fractional divider. The clock divisor can vary between 1 and 65536, in increments of 1/256.

Figure 15:
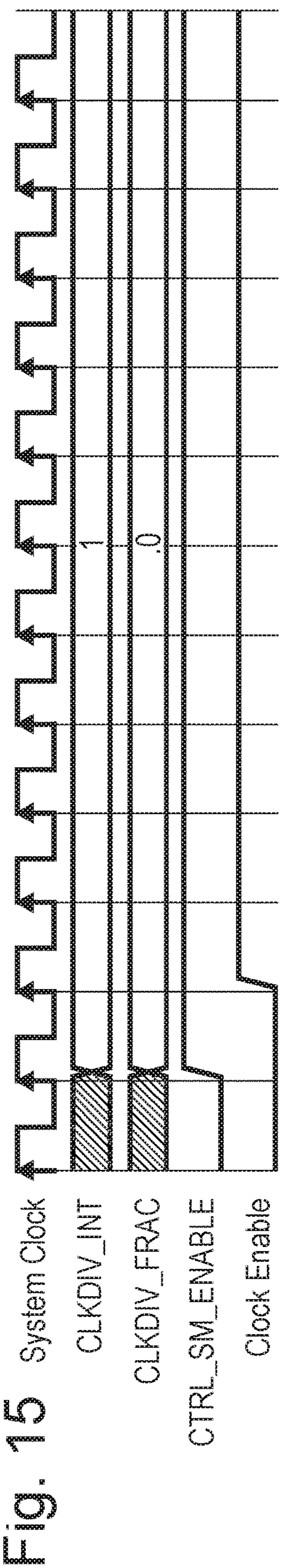
FIG. 15 illustrates state machine operation with a clock divisor of 1.

If the clock divisor is set to 1, the state machine runs on every cycle, i.e. full speed:

FIG. 15 illustrates state machine operation with a clock divisor of 1. Once the state machine is enabled via the CTRL register, its clock enable is asserted on every cycle.

In general, an integer clock divisor of n will cause the state machine to run 1 cycle in every n, giving an effective clock speed of $f_{sys}/n$.

Figure 16:
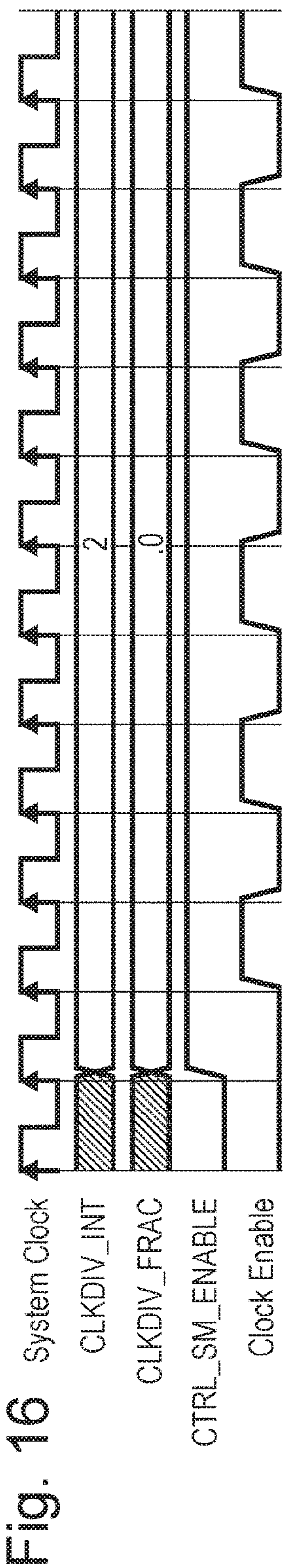
FIG. 16 illustrates state machine operation with integer clock divisors.

FIG. 16 illustrates state machine operation with integer clock divisors, which yield a periodic clock enable. The clock divider repeatedly counts down from n, and emits an enable pulse when it reaches 1.

Fractional division will maintain a steady state division rate of n+f/256, where n and f are the integer and fractional fields of this state machine's CLKDIV register. It does this by selectively extending some division periods from n cycles to n+1.

Figure 17:
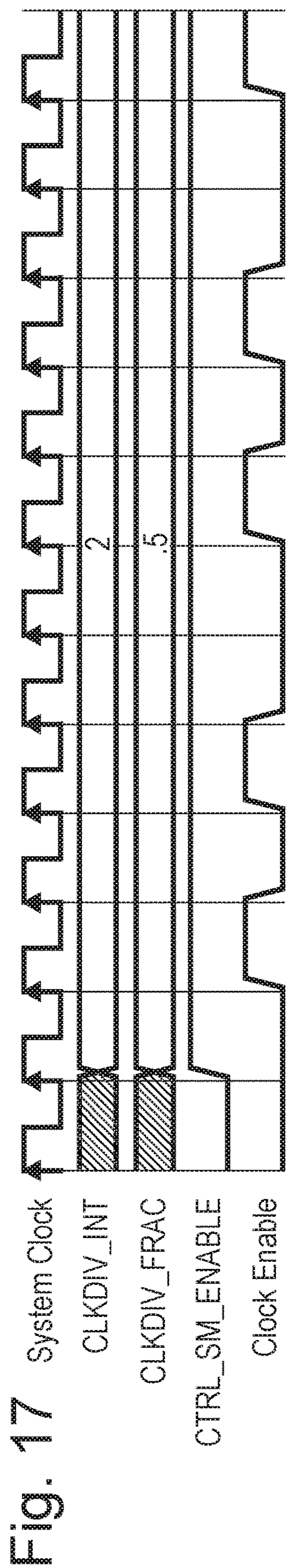
FIG. 17 illustrates state machine operation with fractional clock division.

FIG. 17 illustrates state machine operation with fractional clock division, for example with an average divisor of 2.5. The clock divider maintains a running total of the fractional value from each division period, and every time this value wraps through 1, the integer divisor is increased by one for the next division period.

For small n, the jitter introduced by a fractional divider may be unacceptable. However, for larger values, this effect is much less apparent.

For fast asynchronous serial, it is recommended to use even divisions or multiples of 1 Mbaud where possible, rather than the traditional multiples of 300, to avoid unnecessary jitter.

GPIO Mapping

Internally, PIO has a 32-bit register for the output levels of each GPIO it can drive, and another register for the output enables (Hi/Lo-Z). On every system clock cycle, each state machine can write to some or all of the GPIOs in each of these registers.

Figure 18:
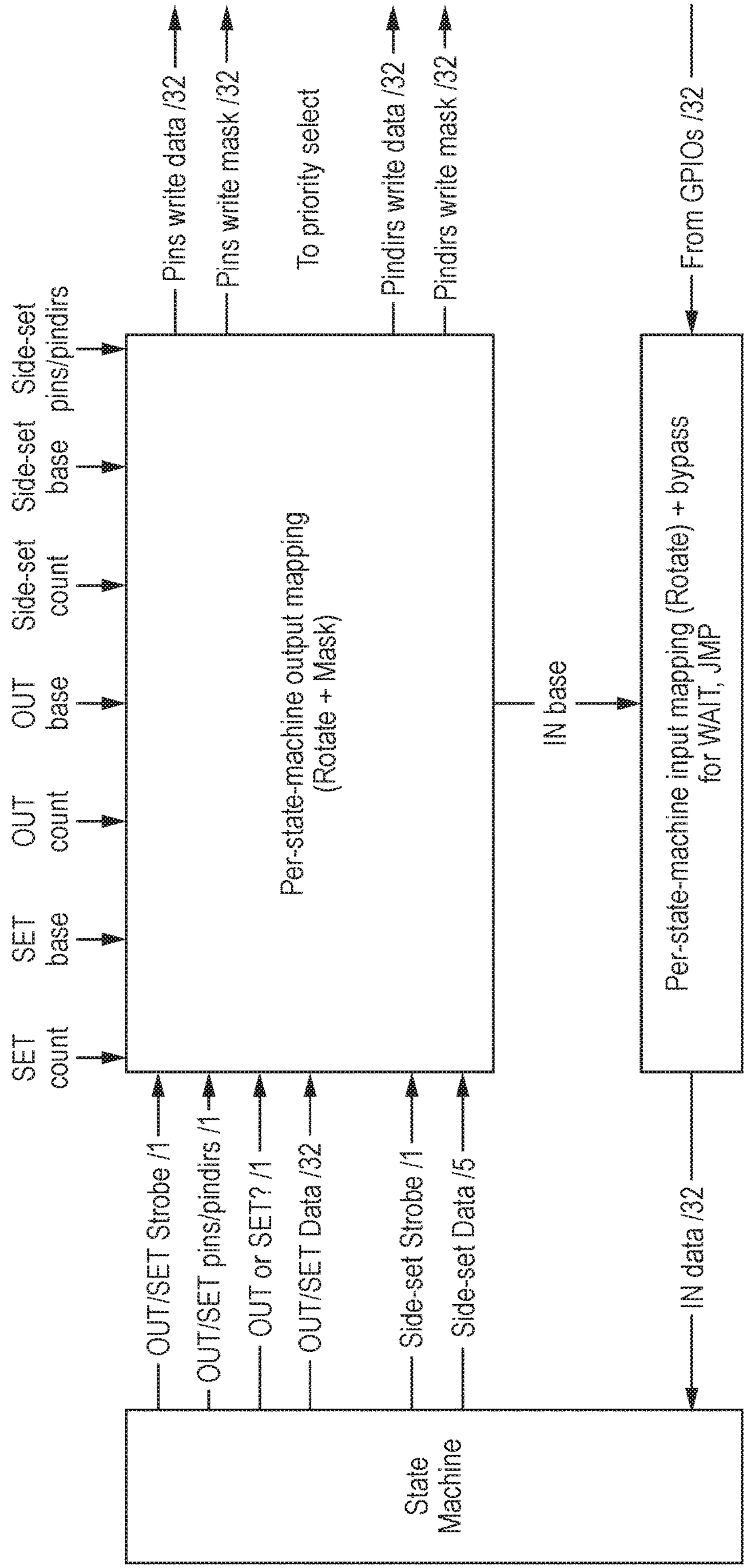
FIG. 18 illustrates GPIO mapping.

FIG. 18 illustrates GPIO mapping. The state machine has two independent output channels, one shared by OUT/SET, and another used by side-set (which can happen at any time). Three independent mappings (first GPIO, number of GPIOs) control which GPIOs OUT, SET and side-set are directed to. Input data is rotated according to which GPIO is mapped to the LSB of the IN data.

The write data and write masks for the output level and output enable registers come from the following sources:

- An OUT instruction writes to up to 32 bits. Depending on the instruction's Destination field, this is applied to either pins or pindirs. The least-significant bit of OUT data is mapped to PINCTRL_OUT_BASE, and this mapping continues for INCTRL_OUT_COUNT bits, wrapping after GPIO31.
- A SET instruction writes up to 5 bits. Depending on the instruction's Destination field, this is applied to either pins or pindirs. The least-significant bit of SET data is mapped to PINCTRL_SET_BASE, and this mapping continues for PINCTRL_SET_COUNT bits, wrapping after GPIO31.
- A side-set operation writes up to 5 bits. Depending on the register field EXECCTRL_SIDE_PINDIR, this is applied to either pins or pindirs. The least-significant bit of side-set data is mapped to PINCTRL_SIDESET_BASE, continuing for PINCTRL_SIDESET_COUNT pins, minus one if EXECCTRL_SIDE_EN is set.

Each OUT/SET/side-set operation writes to a contiguous range of pins, but each of these ranges is independently sized and positioned in the 32-bit GPIO space. This is sufficiently flexible for many applications. For example, if one state machine is implementing some interface such as an SPI on a group of pins, another state machine can run the same program, mapped to a different group of pins, and provide a second SPI interface.

On any given clock cycle, the state machine may perform an OUT or a SET, and may simultaneously perform a side-set. The pin mapping logic generates a 32-bit write mask and write data bus for the output level and output enable registers, based on this request, and the pin mapping configuration.

If a side-set overlaps with an OUT/SET performed by that state machine on the same cycle, the side-set takes precedence in the overlapping region.

Output Priority

Figure 19:
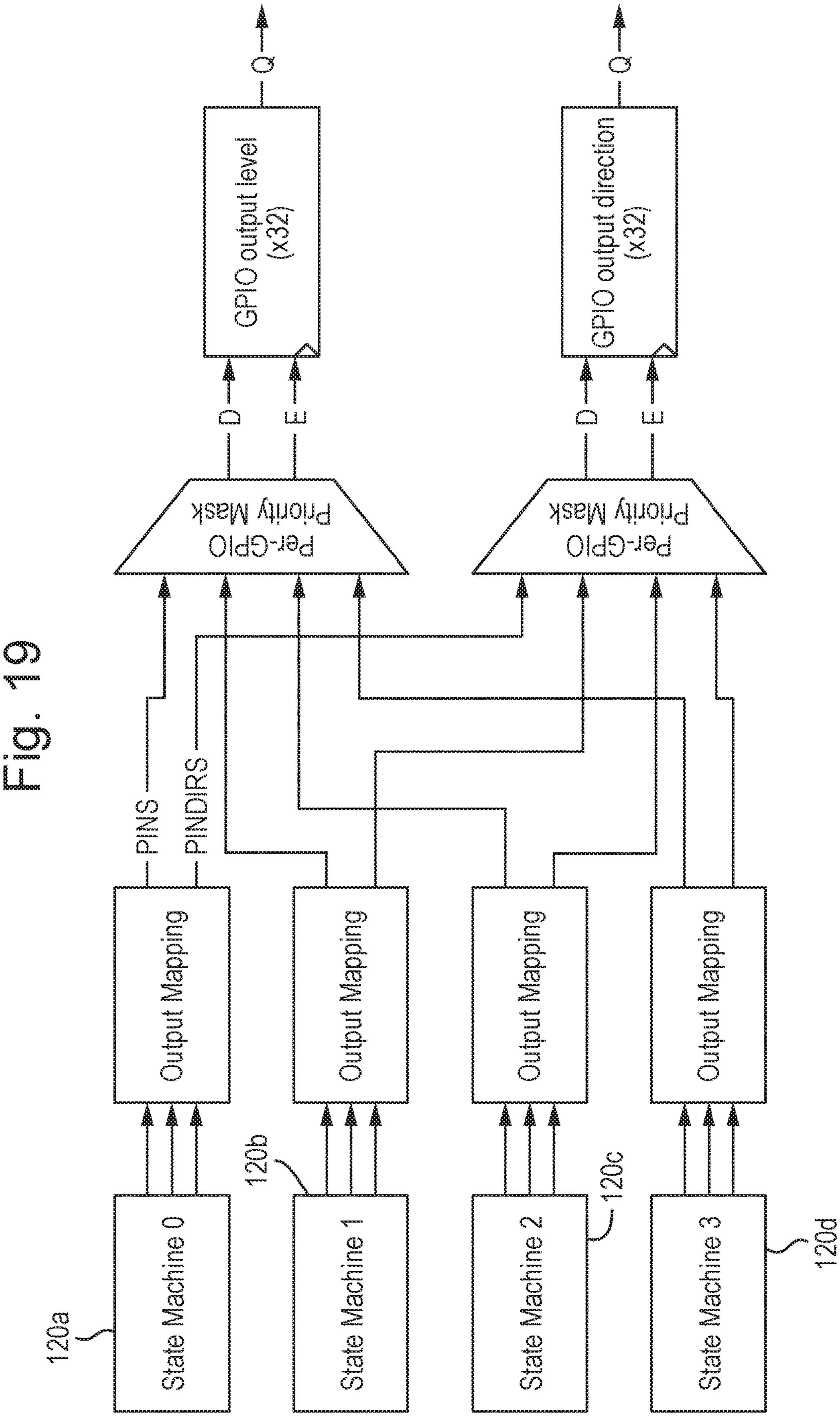
FIG. 19 illustrates per-GPIO priority select of write masks from each state machine.

FIG. 19 illustrates per-GPIO priority select of write masks from each state machine. Each GPIO considers level and direction writes from each of the four state machines 120*a,b*, and applies the value from the highest-numbered state machine.

Each state machine may assert an OUT/SET and a side-set through its pin mapping hardware on each cycle. This generates 32 bits of write data and write mask for the GPIO output level and output enable registers, from each state machine.

For each GPIO, PIO collates the writes from all four state machines, and applies the write from the highest-numbered state machine. This occurs separately for output levels and output values—it is possible for a state machine to change both the level and direction of the same pin on the same cycle (e.g. via simultaneous SET and side-set), or for one state machine to change a GPIO's direction while another changes that GPIO's level. If no state machine asserts a write to a GPIO's level or direction, the value does not change.

Input Mapping

The data observed by IN instructions is mapped such that the LSB is the GPIO selected by PINCTRL_IN_BASE, and successively more-significant bits come from successively higher-numbered GPIOs, wrapping after 31. In other words, the IN bus is a right-rotate of the GPIO input values, by PINCTRL_IN_BASE. If fewer than 32 GPIOs are present, the PIO input is padded with zeroes up to 32 bits. Some instructions, such as WAIT GPIO, use an absolute GPIO number, rather than an index into the IN data bus. In this case, the right-rotate is not applied.

Input Synchronisers

To protect PIO from metastabilities, each GPIO input is equipped with a standard 2-flipflop synchroniser. This adds two cycles of latency to input sampling, but the benefit is that state machines can perform an IN PINS at any point, and will see only a clean high or low level, not some intermediate value that could disturb the state machine circuitry.

This is absolutely necessary for asynchronous interfaces such as UART RX. It is possible to bypass these synchronisers, on a per-GPIO basis. This reduces input latency, but it is then up to the user to guarantee that the state machine does not sample its inputs at inappropriate times. Generally this is only possible for synchronous interfaces such as SPI. Synchronisers are bypassed by setting the corresponding bit in INPUT_SYNC_BYPASS.

Sampling a metastable input can lead to unpredictable state machine behaviour. This should be avoided.

Forced and EXEC'd Instructions

Besides the instruction memory, state machines can execute instructions from 3 other sources:

- MOV EXEC which executes an instruction from some register Source
- OUT EXEC which executes data shifted out from the OSR
- The SMx_INSTR control registers, to which the system can write instructions for immediate execution
- https://datasheets.raspberrypi.com/rp2040/rp2040-datasheet.pdf, page 362—exec_example Here we load an example program into the state machine, which does two things:

- Enters an infinite loop
- Enters a loop which repeatedly pops 32 bits of data from the TX FIFO, and executes the lower 16 bits as an instruction The C program sets the state machine running, at which point it enters the hang loop. While the state machine is still running, the C program forces in a jmp instruction, which causes the state machine to break out of the loop.

When an instruction is written to the INSTR register, the state machine immediately decodes and executes that instruction, rather than the instruction it would have fetched from the PIO's instruction memory. The program counter does not advance, so on the next cycle (assuming the instruction forced into the INSTR interface did not stall) the state machine continues to execute its current program from the point where it left off, unless the written instruction itself manipulated PC.

Delay cycles are ignored on instructions written to the INSTR register, and execute immediately, ignoring the state machine clock divider. This interface is provided for performing initial setup and effecting control flow changes, so it executes instructions in a timely manner, no matter how the state machine is configured.

Instructions written to the INSTR register are permitted to stall, in which case the state machine will latch this instruction internally until it completes. This is signified by the EXECCTRL_EXEC_STALLED flag. This can be cleared by restarting the state machine, or writing a NOP to INSTR.

In the second phase of the example state machine program, the OUT EXEC instruction is used. The OUT itself occupies one execution cycle, and the instruction which the OUT executes is on the next execution cycle. Note that one of the instructions we execute is also an OUT—the state machine is only capable of executing one OUT instruction on any given cycle.

OUT EXEC works by writing the OUT shift data to an internal instruction latch. On the next cycle, the state machine remembers it must execute from this latch rather than the instruction memory, and also knows to not advance PC on this second cycle.

This program will print "12345678" when run.

If an instruction written to INSTR stalls, it is stored in the same instruction latch used by OUT EXEC and MOV EXEC, and will overwrite an in-progress instruction there.

If EXEC instructions are used, instructions written to INSTR must not stall

Described below are a few examples of programs that can be executed by the PIO in order to demonstrate its applicability to a wide variety of applications.

Figure 20:
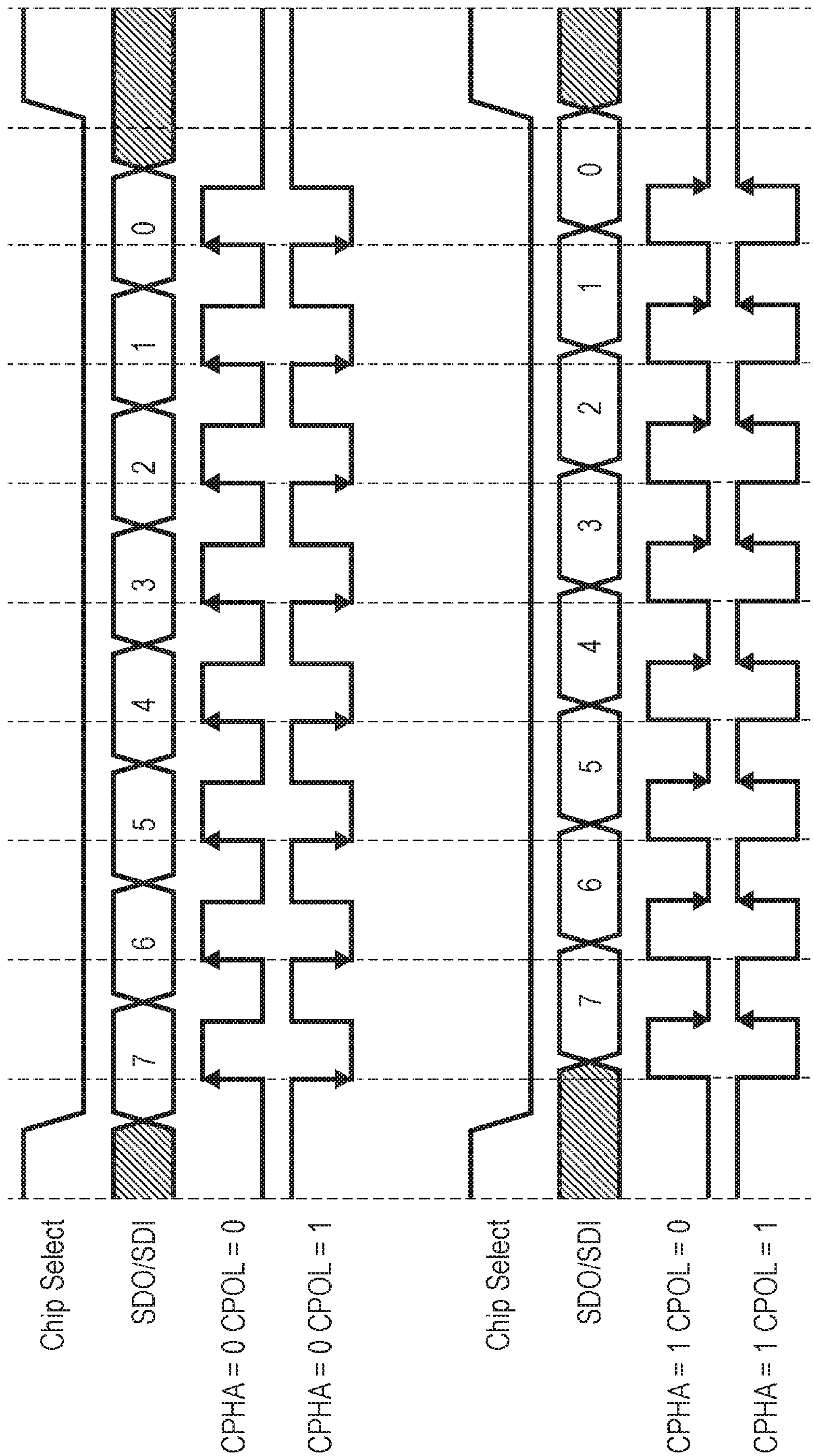
FIG. 20 shows the operation of a duplex SPI.

FIG. 20 shows the operation of a duplex Serial Peripheral Interface (SPI). In SPI, a host and device exchange data over a bidirectional pair of serial data lines, synchronous with a clock (SCK). Two flags, CPOL and CPHA, specify the clock's behaviour. CPOL is the idle state of the clock: 0 for low, 1 for high. The clock pulses a number of times, transferring one bit in each direction per pulse, but always returns to its idle state. CPHA determines on which edge of the clock data is captured: 0 for leading edge, and 1 for trailing edge. The arrows in the figure show the clock edge where data is captured by both the host and device.

SPI is a common serial interface with a twisty history. The following referenced program implements full-duplex (i.e. transferring data in both directions simultaneously) SPI, with a CPHA parameter of 0.

https://github.com/raspberrypi/pico-examples/blob/masterlpio/spi/spi.pio, lines 14-32

This code uses autopush and autopull to continuously stream data from the FIFOs. The entire program runs once for every bit that is transferred, and then loops. The state machine tracks how many bits have been shifted in/out, and automatically pushes/pops the FIFOs at the correct point. A similar program handles the CPHA=1 case:

https://github.com/raspberrypi/pico-examples/blob/master/pio/spi/spi.pio, lines 34-42

A C helper function configures the state machine, connects the GPIOs, and sets the state machine running. Note that the SPI frame size—that is, the number of bits transferred for each FIFO record—can be programmed to any value from 1 to 32, without modifying the program. Once configured, the state machine is set running.

https://github.com/raspberrypi/pico-examples/blob/master/pio/spi/spi.pio, lines 46-71

The state machine will now immediately begin to shift out any data appearing in the TX FIFO, and push received data into the RX FIFO.

https://github.com/raspberrypi/pico-examples/blob/master/pio/spi/pio/spi.c, lines 18-34

Putting this all together, this complete C program will loop back some data through a PIO SPI at 1 MHz, with all four CPOL/CPHA combinations:

https://github.com/raspberrypi/pico-examples/blob/master/pio/spi/spi/loopback.c

WS2812 LEDs are driven by a proprietary pulse-width serial format, with a wide positive pulse representing a "1" bit, and narrow positive pulse a "0". Each LED has a serial input and a serial output; LEDs are connected in a chain, with each serial input connected to the previous LED's serial output.

Figure 21:
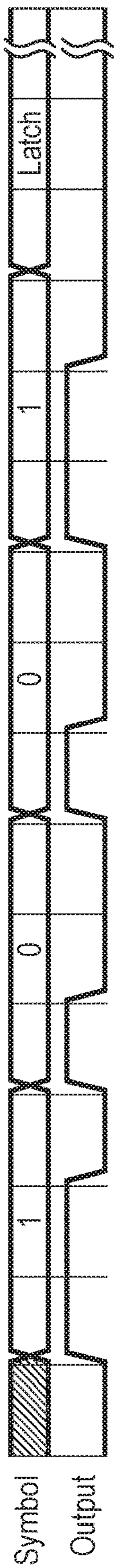
FIG. 21 shows WS2812 LED line format.

FIG. 21 shows WS2812 LED line format. Wide positive pulse for 1, narrow positive pulse for 0, very long negative pulse for latch enable.

The LEDs consume 24 bits of pixel data, then pass any additional input data on to their output. In this way a single serial burst can individually program the colour of each LED in a chain. A long negative pulse latches the pixel data into the LEDs.

https://github.com/raspberrypi/pico-examples/blob/master/pio/ws2812/ws2812.pio, lines 1-27

This program shifts bits from the OSR into X, and produces a wide or narrow pulse on side-set pin 0, based on the value of each data bit. Autopull must be configured, with a threshold of 24. Software can then write 24-bit pixel values into the FIFO, and these will be serialised to a chain of WS2812 LEDs.

https://github.com/raspberrypi/pico-examples/blob/master/pio/ws2812/ws2812.pio

A C program configures the state machine to execute this program correctly, and sends some test patterns to a string of 150 LEDs. This program transmits on GPIO 0, but any pin can be selected, by changing the constant PIN_TX.

The state machine's clock divider is configured to slow execution to around 10 MIPS. If system clock speed is 120 MHz, this is a clock divisor of 12.

Note it is possible to make this program as short as 3 instructions, at the cost of making transmission time dependent on data content:

```
.program ws2812_mini
.side_set 1

.wrap_target
bitloop:
   out x, 1          [5] set 0
   jmp !x bitloop [2] set 1
   nop                  [3] set 1
.wrap
```

Addition

Although not designed for computation, PIO is quite likely Turing-complete, and it is conjectured that it could run DOOM, given a sufficiently high clock speed.

https://github.com/raspberrypi/pico-examples/tree/master/pio/addition/addition.pio, lines 1-26

A full 32-bit addition takes only around one minute at 125 MHz. The program pops two numbers from the TX FIFO and pushes their sum to the RX FIFO, which is perfect for use either with the system DMA, or directly by the processor:

https://github.com/raspberrypi/pico-examples/tree/master/pio/addition/addition.c Clocks The clocks block provides independent clocks to on-chip and external components. It takes inputs from a variety of clock sources allowing the user to trade off performance against cost, board area and power consumption. From these sources it uses multiple clock generators to provide the required clocks. This architecture allows the user flexibility to start and stop clocks independently and to vary some clock frequencies whilst maintaining others at their optimum frequencies.

For very low cost or low power applications where precise timing is not required, the chip can be run from the internal Ring Oscillator (ROSC). Alternatively the user can provide external clocks or construct simple relaxation oscillators using the GPIOs, the XIN input and appropriate external passive components. Where timing is more critical, the Crystal Oscillator (XOSC) can provide an accurate reference to the 2 on-chip PLLs to provide fast clocking at precise frequencies.

The clock generators select from the clock sources and optionally divide the selected clock before outputting through enable logic which provides automatic clock disabling in SLEEP mode.

An on-chip frequency counter facilitates debugging of the clock setup and also allows measurement of the frequencies of external clocks. The on-chip resus component restarts the system clock from a known good clock if it is accidentally stopped. This allows the software debugger to access registers and debug the problem.

The chip has an ultra-low power mode called DORMANT in which all on-chip clock sources are stopped to save power. External sources are not stopped and can be used to provide a clock to the on-chip RTC which can provide an alarm to wake the chip from DORMANT mode. Alternatively the GPIO interrupts can be configured to wake the chip from DORMANT mode in response to an external event.

Up to 4 generated clocks can be output to GPIOs at up to 50 MHz. This allows the user to supply clocks to external devices, thus reducing component counts in power, space and cost sensitive applications.

Figure 22:
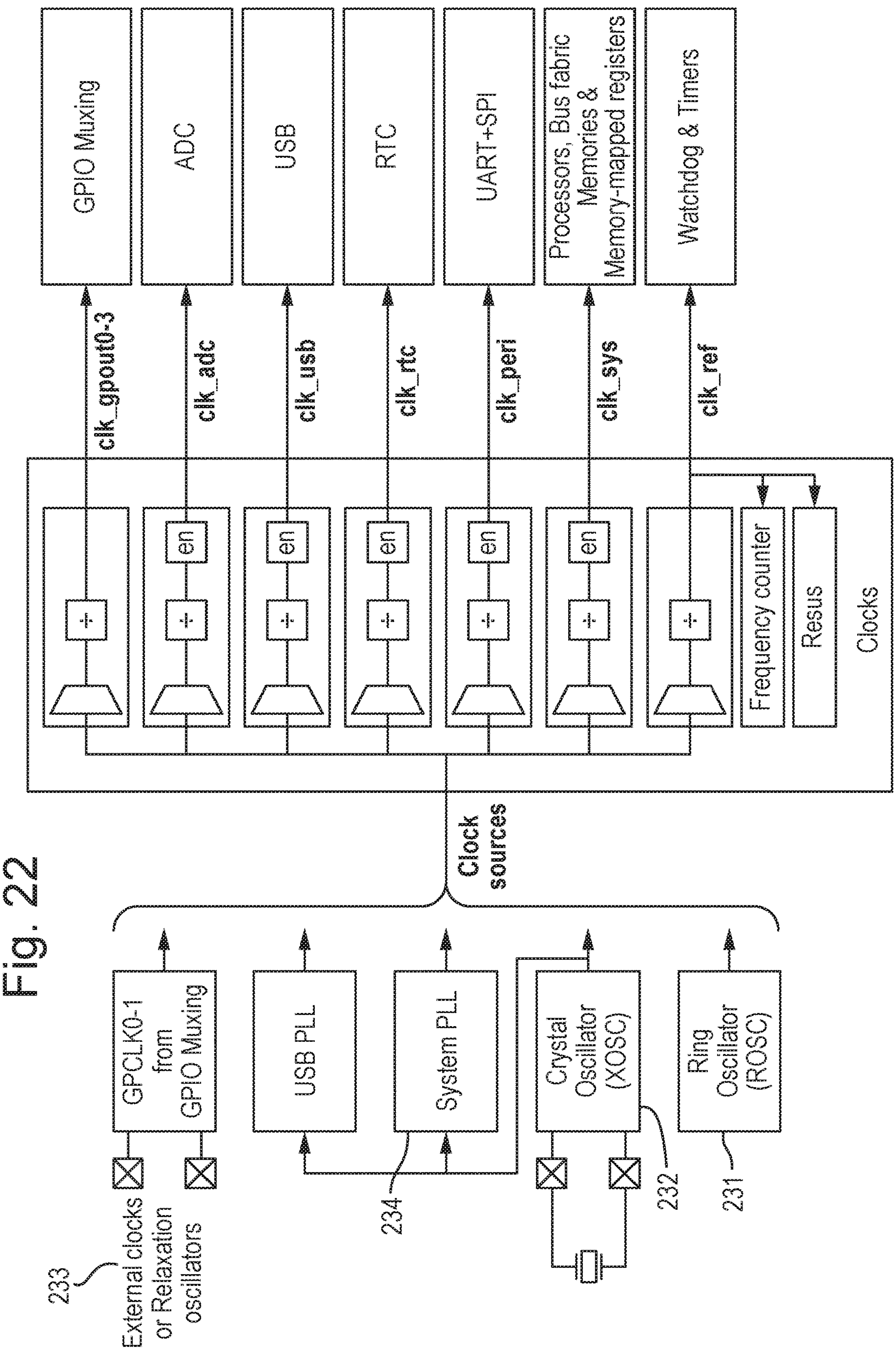
FIG. 22 shows the crystal oscillator in more detail.

The RP2040 can be run from a variety of clock sources shown in FIG. 22. This flexibility allows the user to optimise the clock setup for performance, cost, board area and power consumption. The sources include the on-chip Ring Oscillator 231, the Crystal Oscillator 232, external clocks 233 from GPIOs and the PLLs 234.

The on-chip Ring Oscillator 231 requires no external components. It runs automatically from power-up and is used to clock the processors during the initial boot stages. The startup frequency is typically 6 MHz but varies with PVT (Process, Voltage and Temperature). The frequency is likely to be in the range 4-8 MHz and is guaranteed to be in the range 1-12 MHz.

For low cost applications where frequency accuracy is unimportant, the chip can continue to run from the ROSC. If greater performance is required the frequency can be increased in fine steps to a frequency well beyond the capability of the chip's components by programming the registers in the Ring Oscillator. The frequency will vary with PVT (Process, Voltage and Temperature) so the user must take care to avoid exceeding the maximum frequencies described in the clock generators section. This variation can be mitigated in various ways if the user wants to continue running from the ROSC at a frequency close to the maximum. Alternatively the user can use an external clock or the XOSC to provide a stable reference clock and use the PLLs to generate the higher frequencies. However, this will require external components, will cost board area and will increase power consumption.

If an external clock or the XOSC is used then the ROSC can be stopped to save power. However, the reference clock generator and the system clock generator must be switched to an alternate source before doing so.

The ROSC is not affected by SLEEP mode. If required the frequency can be reduced before entering SLEEP mode to save power. On entering DORMANT mode the ROSC is automatically stopped and is restarted in the same configuration when exiting DORMANT mode. If the ROSC is driving clocks at close to their maximum frequencies then it is recommended to drop the frequency before entering SLEEP or DORMANT mode to allow for frequency variation due to changes in environmental conditions during SLEEP or DORMANT mode.

Figure 23:
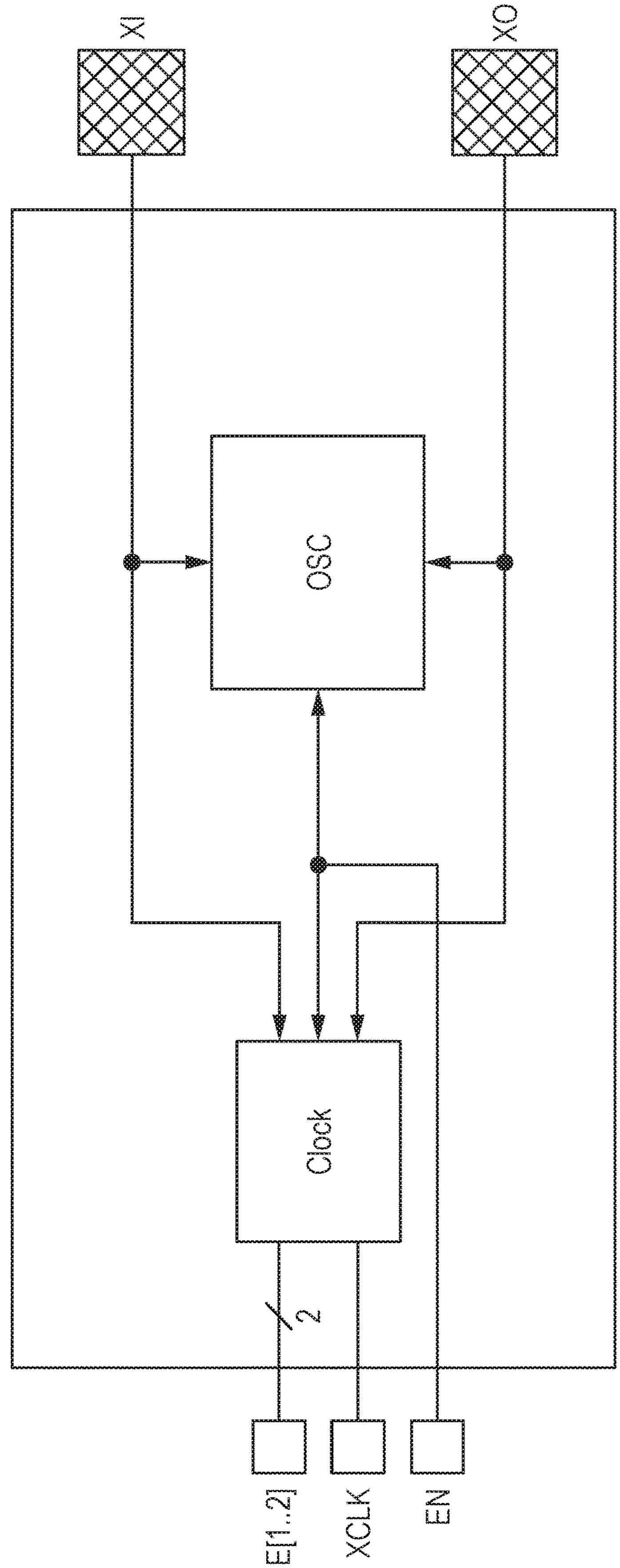
FIG. 23 shows an overview of clock resources.

If the user wants to use the ROSC clock externally then it can be output to a GPIO pin using one of the clk_gpclk0-3 generators The Crystal Oscillator (XOSC), shown in FIG. 23 uses an external crystal to produce an accurate reference clock. In the RP2040 reference design, this reference clock is 12 MHz. The reference clock is distributed to the PLLs, which can be used to multiply the XOSC frequency (for example, to provide a 48 MHz USB clock and a 133 MHz system clock). The XOSC clock is also a clock source for the clock generators, so can be used directly if required. It is also possible to drive an external clock directly into the XIN pin XI, and disable the oscillator circuit.

The XOSC is disabled on boot, as RP2040 boots using the Ring Oscillator (ROSC). To start the XOSC, the programmer must set the enable bit and then poll the status register to know that the XOSC output is stable.

The XOSC supports dormant mode, which allows it to be stopped from oscillating until woken up by an asynchronous interrupt. This can either come from the RTC, being clocked by an external clock, or a GPIO pin going high or low. To put the XOSC into dormant mode, a specific code has to be written to the dormant register. This means it is unlikely to be done by mistake.

Atomic Register Access

Peripheral registers may be accessed in one of 4 methods, selected by address decode.

Addr+0x0000: normal read write access

Addr+0x1000: atomic XOR on write

Addr+0x2000: atomic bitmask set on write

Addr+0x3000: atomic bitmask clear on write

This allows individual fields of a control register to be modified without performing a read-modify-write sequence in software: instead the changes are posted to the peripheral, and performed in-situ. Without this capability, it is difficult to safely access IO registers when an interrupt service routine is concurrent with code running in the foreground, or when the two processors are running code in parallel. Note that this is more flexible than byte or halfword writes, as any combination of fields can be updated in one operation.

Each register block is allocated 4 kB of address space, with the four atomic access aliases occupying a total of 16 kB. Most peripherals on RP2040 provide this functionality natively, and atomic writes have the same timing as normal read/write access. Some peripherals (I2C, UART, SPI and SSI) instead have this functionality added using a bus interposer, which translates upstream atomic writes into downstream read-modify-write sequences, at the boundary of the peripheral. This extends the access time by two system clock cycles.

CONCLUSION

Logic modules and components of the present invention can be incorporated in a variety of other devices, such as IO modules, interfaces, single board computers, micro-controller devices, etc. and are particularly useful in portable devices such as smart phones due to their low power consumption. Logic modules of the invention can be embodied in separated integrated circuits or incorporated in other devices, such as System on Chip devices. The PIO and state machines require little silicon real estate, comparable to a conventional single-purpose interface, and so can be included in a die with other modules.

An integrated circuit according to an embodiment of the invention can be mounted on a daughter board that is connected to a motherboard or main board of a computer via a USB hub.

The methods of the present invention may be performed by computer systems comprising one or more computers. A computer used to implement the invention may comprise one or more processors, including general purpose CPUs, graphical processing units (GPUs), tensor processing units (TPU) or other specialised processors. A computer used to implement the invention may be physical or virtual. A computer used to implement the invention may be a server, a client or a workstation. Multiple computers used to implement the invention may be distributed and interconnected via a network such as a local area network (LAN) or wide area network (WAN). Individual steps of the method may be carried out by a computer system but not necessarily the same computer system. Results of a method of the invention may be displayed to a user or stored in any suitable storage medium. The present invention may be embodied in a non-transitory computer-readable storage medium that stores instructions to carry out a method of the invention. Any suitable programming language may be used to implement the invention. The present invention may be embodied in a computer system comprising one or more processors and memory or storage storing instructions to carry out a method of the invention.

Having described the invention it will be appreciated that variations may be made on the above described embodiments, which are not intended to be limiting. The invention is defined in the appended claims and their equivalents.

The invention claimed is:

1. An I/O circuit block comprising:

a register unit;

an input/output unit connected to a plurality of terminals;

an instruction memory; and a plurality of state machines configured to execute a program stored in the instruction memory to transfer data between the register unit and the input/output unit, wherein instructions executed by one of the plurality of state machines to perform arithmetic function include an operation to set a value to at least one of the plurality of terminals concurrently with execution of another operation defined by the instruction, wherein at least one state machine of the plurality of state machines comprises a configurable clock divider to enable the at least one state machine to operate at a lower clock rate than an external clock.

2. An I/O circuit block according to claim 1 wherein the state machine is configured to execute instructions of an instruction set, the instruction set including: an IN instruction to transfer a specified number of bits into the register unit; and an OUT instruction to transfer a specified number of bits from the register unit.

3. An I/O circuit block according to claim 2 wherein the instruction set consists of: the IN instruction; the OUT instruction; a JMP instruction; a WAIT instruction; a PUSH instruction; a PULL instruction; a MOV instruction; an IRQ instruction; and a SET instruction.

4. An I/O circuit block according to claim 1 wherein the register unit comprises an input FIFO register and an output FIFO register, the input FIFO register and the output FIFO register being configurable as a single, double length FIFO register for input or output.

5. An I/O circuit block according to claim 1 wherein the state machine comprises an input shift register and an output shift register and is operable in an auto pull mode wherein a first predetermined number of bits are transferred from the register unit to the output shift register when the content of the output shift register is less than a first threshold and/or in an auto push mode wherein a second predetermined number of bits are transferred to the register unit from the input shift register when the content of the input shift register is greater than a second threshold.

6. An I/O circuit block according to claim 1 wherein the state machine is configured to also execute instructions from one or more of: the register unit, a shift register within the state machine and a configuration register within the state machine.

7. An I/O circuit block according to claim 1 wherein the state machine comprises a wrap control field specifying a sequence of instructions which are executed repeatedly.

8. An I/O circuit block according to claim 1 having a plurality of state machines and a corresponding plurality of register units.

9. An I/O circuit block according to claim 8 wherein the instruction memory is shared between the plurality of state machines and configured for multiple simultaneous reads.

10. An I/O circuit block according to claim 8 wherein the input/output unit comprises a multiplexer configured to enable each of the state machines to be connected to any of the terminals.

11. An I/O circuit block according to claim 8 further comprising a plurality of IRQ flags and wherein each of the state machines can set and read each of the IRQ flags.

12. An integrated circuit comprising at least one I/O circuit block according to claim 1.

13. An integrated circuit according to claim 12 further comprising a plurality of clock sources and wherein the integrated circuit is operable in a DORMANT mode wherein all the clock sources are halted, and wherein the circuit is configured to wake from DORMANT mode on receipt of an input without a clock running.

14. An integrated circuit according to claim 12 further comprising a plurality of peripheral registers and wherein the peripheral registers are addressable bitwise in at least one of the following modes:

atomic XOR on write atomic bitmask set on write atomic bitmask clear on write.

15. An integrated circuit according to claim 14 wherein the peripheral register comprises a read/write accessible register and a bus interposer which translates upstream atomic writes into downstream read-modify-write sequences.

16. An integrated circuit according to claim 12 further comprising at least one general purpose CPU.

17. An assembler for a state machine having an instruction set consisting of: an IN instruction; an OUT instruction; a JMP instruction; a WAIT instruction; a PUSH instruction; a PULL instruction; a MOV instruction; an IRQ instruction; and a SET instruction, wherein the instructions to perform arithmetic function include an operation to set a value to at least one of a plurality of terminals concurrently with execution of another operation defined by the instruction.

18. A program executable by a state machine having an instruction set consisting of: an IN instruction; an OUT instruction; a JMP instruction; a WAIT instruction; a PUSH instruction; a PULL instruction; a MOV instruction; an IRQ instruction; and a SET instruction, wherein the instructions to perform arithmetic function include an operation to set a value to at least one of a plurality of terminals concurrently with execution of another operation defined by the instruction.

* * * * *